US008881059B2

(12) United States Patent
Adachi

(10) Patent No.: US 8,881,059 B2
(45) Date of Patent: Nov. 4, 2014

(54) OBJECT CONTROL DEVICE, OBJECT CONTROL METHOD, COMPUTER-READABLE RECORDING MEDIUM, AND INTEGRATED CIRCUIT

(75) Inventor: Takao Adachi, Hyogo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 136 days.

(21) Appl. No.: 13/640,176

(22) PCT Filed: Feb. 9, 2012

(86) PCT No.: PCT/JP2012/000869
§ 371 (c)(1),
(2), (4) Date: Oct. 9, 2012

(87) PCT Pub. No.: WO2012/124250
PCT Pub. Date: Sep. 20, 2012

(65) Prior Publication Data
US 2013/0031511 A1    Jan. 31, 2013

(30) Foreign Application Priority Data

Mar. 15, 2011  (JP) .................................. 2011-056125

(51) Int. Cl.
*G06F 3/048* (2013.01)
*G06F 3/0481* (2013.01)
*G06F 9/44* (2006.01)

(52) U.S. Cl.
CPC ............ *G06F 3/0481* (2013.01); *G06F 9/4443* (2013.01)
USPC .......................... 715/825; 715/852; 715/863

(58) Field of Classification Search
None
See application file for complete search history.

(56) References Cited

U.S. PATENT DOCUMENTS

| 8,160,311 | B1* | 4/2012 | Schaefer ....................... 382/118 |
| 8,412,449 | B2* | 4/2013 | Trepagnier et al. ........... 701/301 |
| 8,519,947 | B2* | 8/2013 | Cruz-Hernandez et al. .. 345/156 |
| 2002/0130862 | A1* | 9/2002 | Lee et al. ....................... 345/420 |
| 2008/0211771 | A1* | 9/2008 | Richardson ................... 345/158 |

(Continued)

FOREIGN PATENT DOCUMENTS

| JP | 2000-276613 | 10/2000 |
| JP | 2006-343953 | 12/2006 |
| JP | 2008-29694 | 2/2008 |
| JP | 2009-123018 | 6/2009 |

OTHER PUBLICATIONS

International Search Report issued May 15, 2012 in International (PCT) Application No. PCT/JP2012/000869.

*Primary Examiner* — Matt Kim
*Assistant Examiner* — Hua Lu
(74) *Attorney, Agent, or Firm* — Wenderoth, Lind & Ponack, L.L.P.

(57) ABSTRACT

A virtual object display determination unit identifies from real object display determination information a priority corresponding to a movement of a user indicated by user movement information notified by a state communication unit and, at the same time, identifies from real object attribute information a priority corresponding to a state change indicated by state change information notified by the state communication unit. By comparing the two identified priorities, the virtual object display determination unit determines whether or not to change a display mode of a virtual object. A UI generation unit generates a UI to be presented to the user based on a determination result of the virtual object display determination unit, and causes the UI to be displayed by a UI display unit.

15 Claims, 17 Drawing Sheets

(56) References Cited

U.S. PATENT DOCUMENTS

| | | | |
|---|---|---|---|
| 2009/0128564 A1* | 5/2009 | Okuno | 345/427 |
| 2011/0206274 A1* | 8/2011 | Tateno et al. | 382/154 |
| 2011/0286673 A1* | 11/2011 | Givon et al. | 382/199 |
| 2012/0113140 A1* | 5/2012 | Hilliges et al. | 345/633 |
| 2012/0206485 A1* | 8/2012 | Osterhout et al. | 345/633 |
| 2012/0235902 A1* | 9/2012 | Eisenhardt et al. | 345/156 |

* cited by examiner

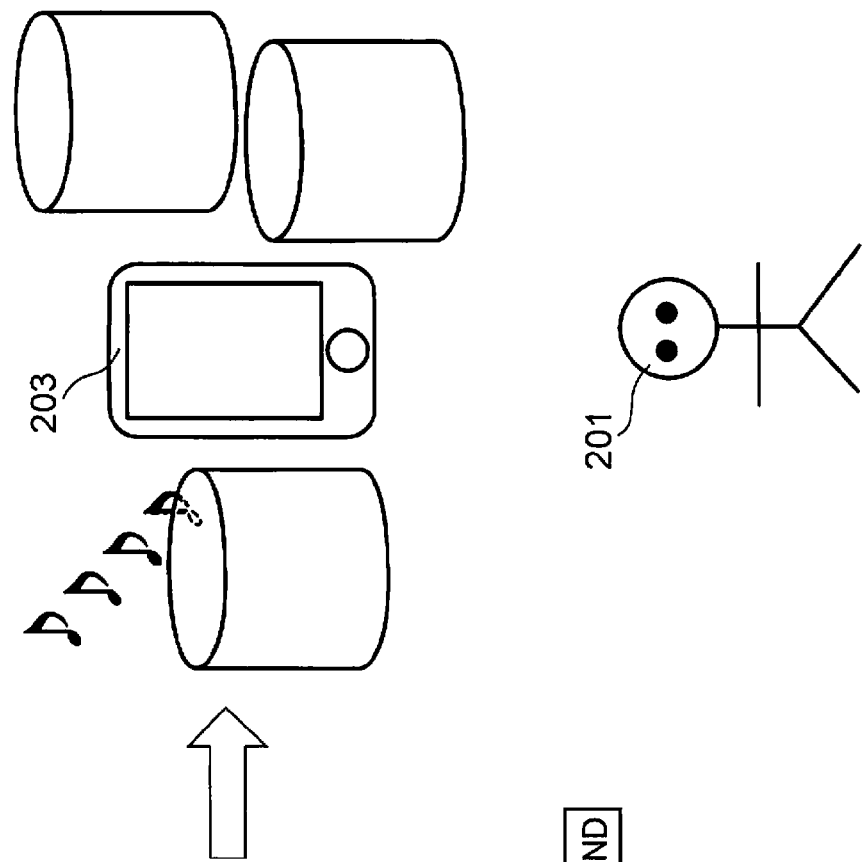
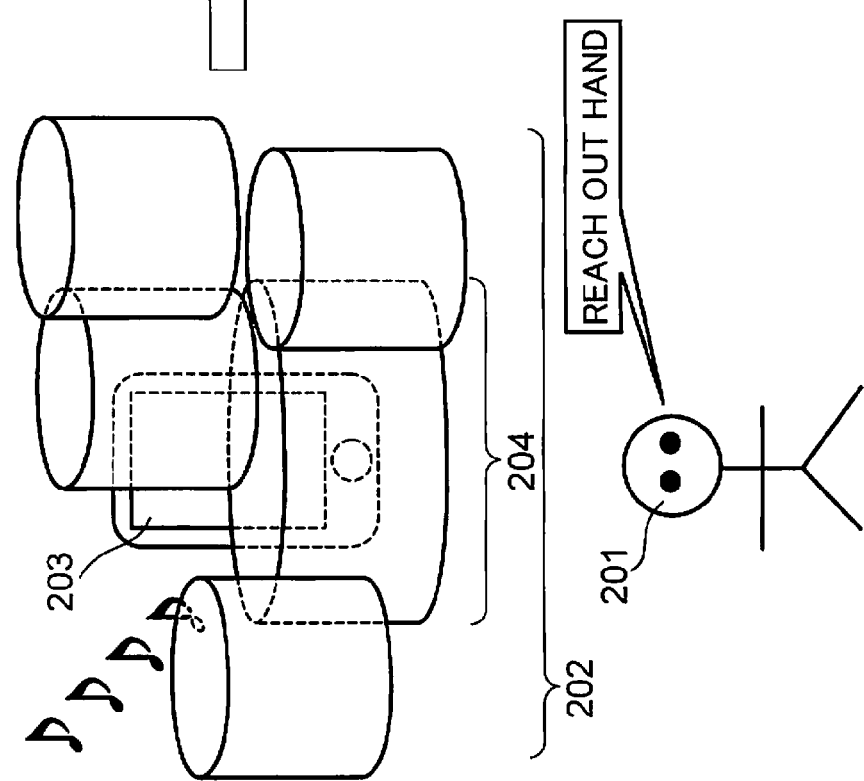

FIG.6

| USER MOVEMENT | PRIORITY |
|---|---|
| DO NOTHING | 1 |
| TURN HEAD | 2 |
| TURN BODY | 3 |
| REACH OUT HAND | 4 |
| APPROACH | 5 |

FIG.7

```
MOBILE PHONE
STATE: RINGTONE      PRIORITY: 4
       SOUNDS
POSITION: (x, y, z)  SIZE: V
```

FIG.9

| USER MOVEMENT | APPROXIMATE MOVEMENT |
|---|---|
| REACH OUT HAND | REACH OUT FACE |
| REACH OUT HAND | REACH OUT FOOT |

FIG.10

MOBILE PHONE
STATE: RINGTONE SOUNDS    PRIORITY: 4
POSITION: (x, y, z)    SIZE: V,
　　　　　　　　　　EXPANDED REGION DISTANCE:L

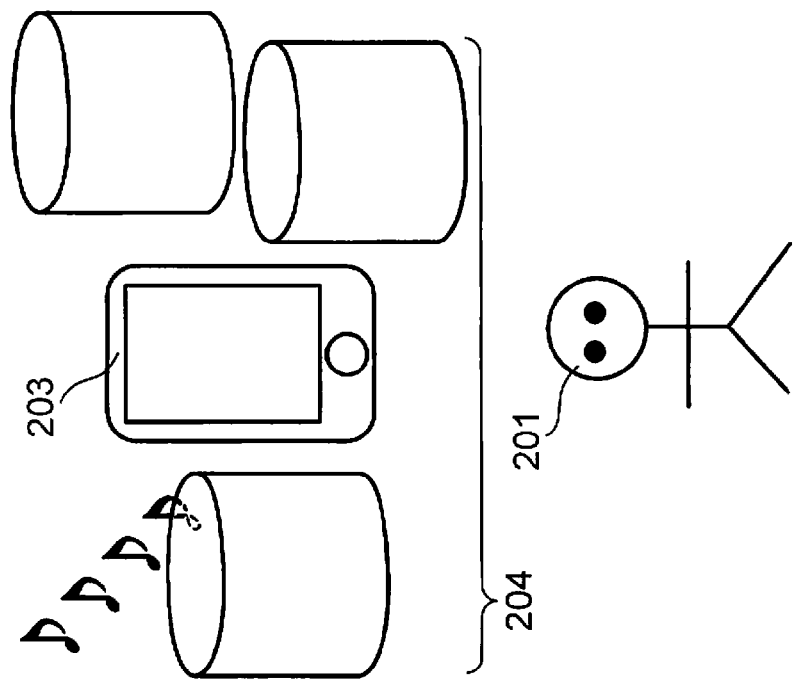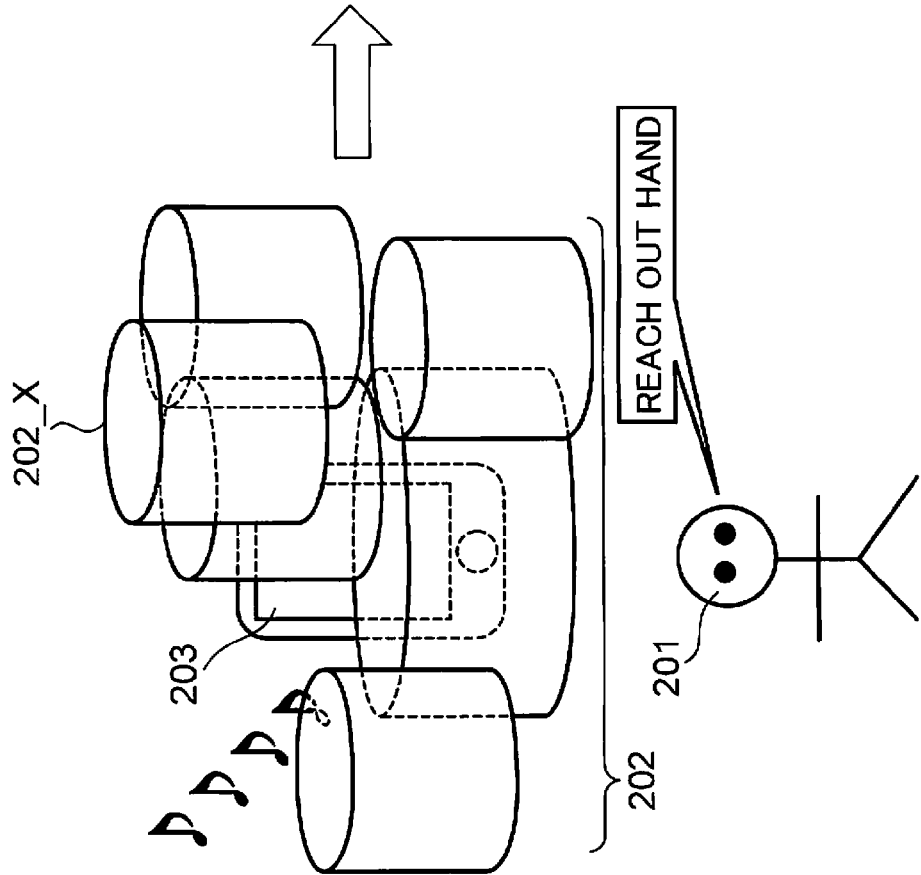

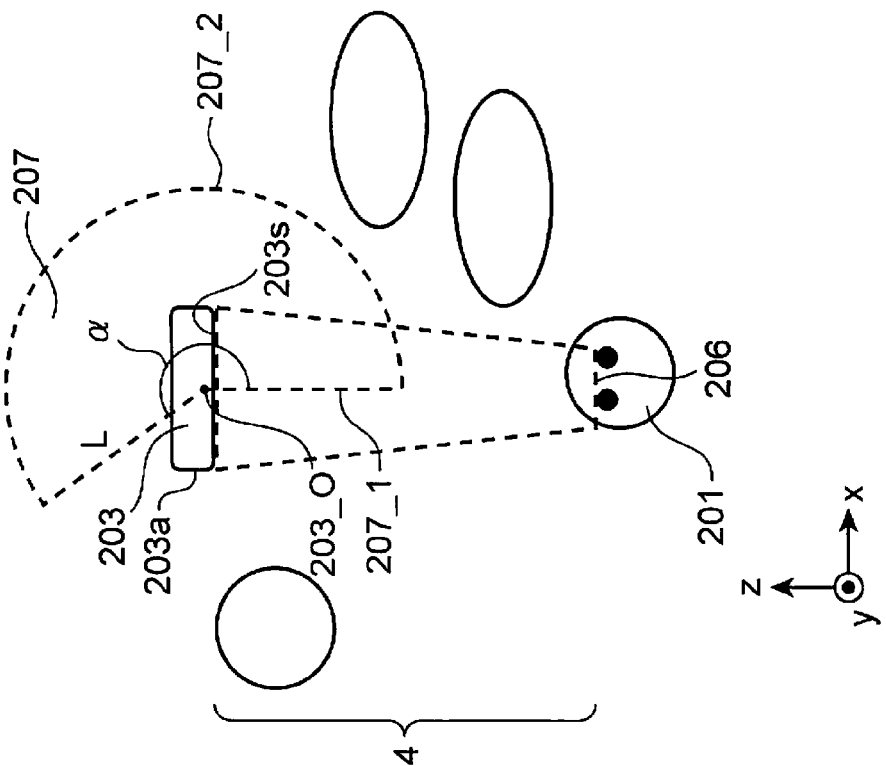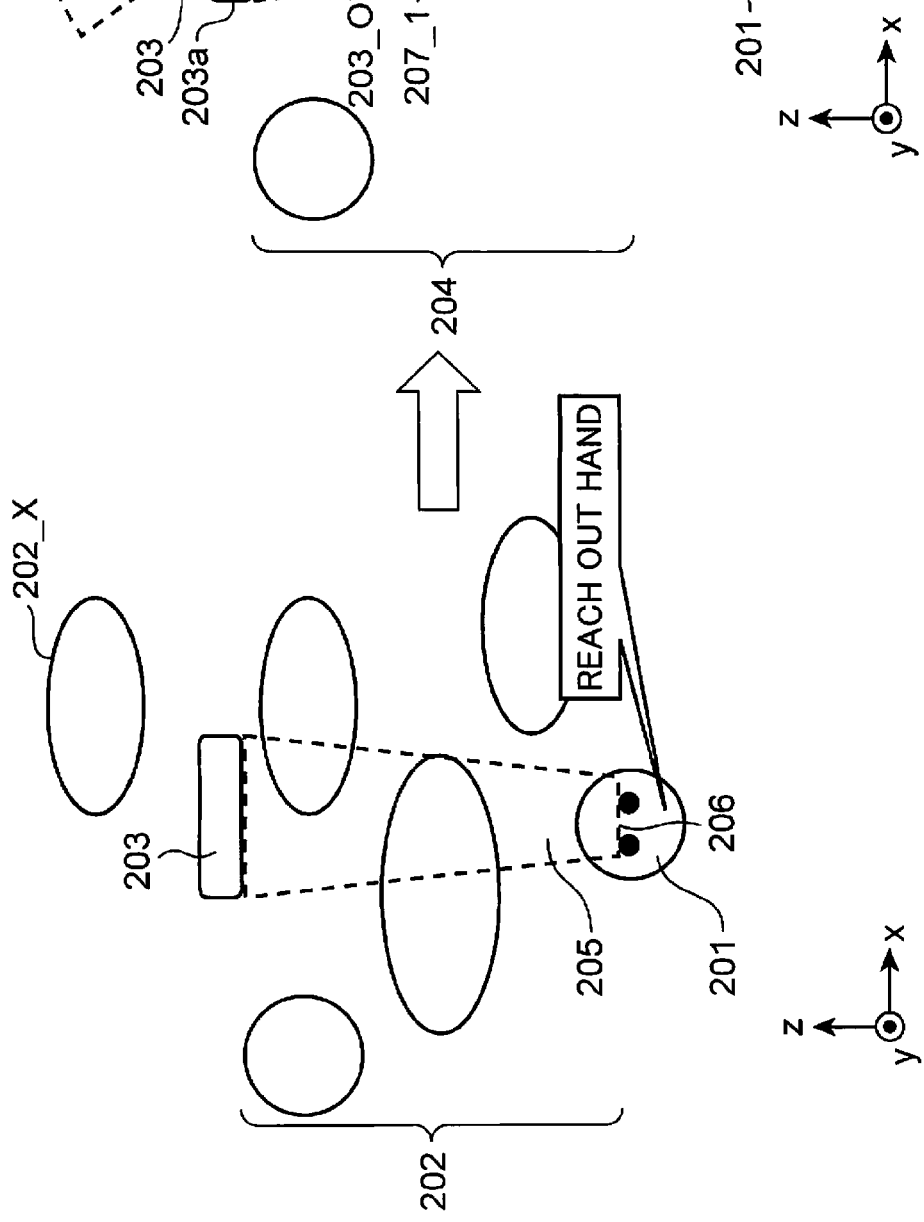

OBJECT CONTROL DEVICE, OBJECT CONTROL METHOD, COMPUTER-READABLE RECORDING MEDIUM, AND INTEGRATED CIRCUIT

BACKGROUND OF THE INVENTION

1. Technical Field

The present invention relates to controlling display of a virtual object that is virtually displayed in a virtual reality space and, in particular, to improving visibility of a real object whose state has changed in a real space when displaying a virtual object superimposed on the real object.

2. Background Art

Conventionally, in a virtual reality space that is realized by using a head mounted display or the like, a virtually displayed object (hereinafter, referred to as a virtual object) may be displayed superimposed on an object existing in a real space (hereinafter, referred to as a real object). In such situations, as a user attempts to make some kind a move with respect to the real object, the user's field of view of the real object may sometimes become blocked by a virtual object displayed in front of the real object from the perspective of the user, in which case the real object becomes unviewable from the user.

FIGS. 18 and 19 are diagrams showing examples in which a real object and a virtual object are displayed superimposed in a virtual reality space. In FIG. 18, from the perspective of a user A201, a virtual object group A202 made up of a plurality of virtual objects is displayed superimposed in front of a mobile phone A203 that is a real object. In this case, the virtual object group A202 is a collection of transparent or non-transparent virtual objects. In FIG. 19 also, from the perspective of a user B211, a virtual object group B212 is displayed superimposed in front of a mobile phone B213 in a similar manner to FIG. 18.

FIG. 18 shows a case where a voice call is received by the mobile phone A203, and FIG. 19 shows a case where an e-mail is received by a mobile phone. A difference between FIGS. 18 and 19 is in moves that a user makes based on judgments made by the user on what has been received by the mobile phone. In FIG. 18, since a voice call has been received by the mobile phone A203, the user A201 makes a move of reaching out a hand toward the mobile phone A203. In other words, in the case where a voice call is received by the mobile phone A203, since the mobile phone A203 must be picked up immediately, the user A201 makes a move of reaching out a hand.

In this case, if the virtual object group A202 is displayed in front of the mobile phone A203, a problem arises in that the mobile phone A203 becomes hidden by the virtual object group A202 and the user A201 cannot pick up the mobile phone A203 with ease. Therefore, in this case, by hiding the virtual object group A202, the user is able to pick up the mobile phone A203 with ease.

On the other hand, in FIG. 19, since an e-mail has been received by the mobile phone B213, the user B211 makes a move of turning around to the mobile phone B213. In other words, in a case where an e-mail is received by the mobile phone B213, there is no need to immediately pick up the mobile phone B213. Therefore, the user B211 simply makes a move of turning around to the mobile phone B213 and does not make a move of picking up the mobile phone B213 as is the case where a voice call is received.

In this case, since the user B211 need not pick up the mobile phone B213, the virtual object group B212 does not pose a problem for the user B211 even when displayed in front of the mobile phone B213. Moreover, by leaving the virtual object group B212 displayed, a sense of presence that is unique to an augmented reality space can be imparted to the user B211.

As described above, depending on a state of a real object and a move made by a user with respect to the state, there are cases where it is better to hide the virtual object groups A202 and B212 and cases where it is better to display the virtual object groups A202 and B212.

Techniques utilizing a virtual reality space are adopted in medicine or the like. For example, Patent Document 1 discloses an image processing device which displays a surgical site in a virtual reality space, wherein a site included in a field-of-view secured region which exists between a user's field of view and the surgical site is deemed as an obstacle and is hidden, and the fact that the obstacle has been hidden is notified to the user. According to this technique, a positional relationship between a surgical site and an obstacle can be clarified and, at the same time, the user can readily observe the surgical site.

However, in Patent Document 1, surgical sites that are desirably constantly displayed as observation objects are set in advance, and all obstacles are uniformly hidden regardless of whether or not the user makes a move such as coming into contact with a surgical site. Therefore, Patent Document 1 is problematic in that obstacles cannot be switched between displayed and hidden modes in accordance with moves made by the user's will in response to changes in the state of a real object. As a result, even if the technique disclosed in Patent Document 1 is applied to an augmented reality space in which a virtual object is displayed, visibility of a real object cannot be improved while imparting a sense of presence unique to the augmented reality space to a user.

Patent Document 1: Japanese Patent Application Laid-open No. 2008-029694

SUMMARY OF THE INVENTION

An object of the present invention is to provide an object control device which enables a user to readily make a movement with respect to a real object whose state has changed while imparting a sense of presence of an augmented reality space to the user.

An object control device according to an aspect of the present invention is an object control device that controls display of a virtual object in a virtual reality space, the object control device including: a user movement detection unit that detects a movement of a user; a user movement notification unit that notifies user movement information indicating a user movement detected by the user movement detection unit; a real object state detection unit that detects a change in a state of a real object existing in the virtual reality space; a real object state notification unit that notifies state change information indicating a change in the state of the real object detected by the real object state detection unit; a state communication unit that notifies user movement information notified by the user movement notification unit and state change information notified by the real object state notification unit; a virtual object display determination unit that determines whether or not to change a display mode of the virtual object so as to expose the real object whose state has changed based on the user movement information and the state change information notified by the state communication unit; a UI generation unit that generates a UI (user interface) to be presented to the user based on a determination result by the virtual object display determination unit; and a UI display unit that displays the UI generated by the UI generation unit.

In addition, an object control method, an object control program, and an integrated circuit according to other aspects of the present invention are similar in configuration to the object control device described above.

BRIEF DESCRIPTION OF THE DRAWINGS

FIGS. 2A and 2B are explanatory diagrams of processing in a case where the object control device according to the embodiment of the present invention hides a virtual object in accordance with a user movement.

FIG. 6 is a diagram showing an example of real object display determination information.

FIG. 7 is a diagram showing an example of real object attribute information.

FIG. 9 is a diagram showing an example of approximate movement information.

FIG. 10 is a diagram showing an example of real object attribute information when an attribute that expands a field-of-view region is retained.

FIGS. 11A and 11B are explanatory diagrams of processing when a virtual object is hidden in accordance with a user movement in a case where the object control device according to the embodiment of the present invention has set an expanded field-of-view region.

FIGS. 12A and 12B are diagrams showing FIGS. 11A and 11B from above.

DETAILED DESCRIPTION OF THE INVENTION

Hereinafter, an object control device according to an embodiment of the present invention will be described with reference to the drawings.

(Outline)

First, an outline of the object control device according to an embodiment of the present invention will be provided. In the present embodiment, it is assumed that the object control device is applied to a head mounted display to be worn by a user. Therefore, an image of a virtual reality space in which a virtual object is superimposed on an image of a real space is displayed on a display, and the user recognizes objects in the real space by viewing the image of the virtual reality space. Hereinafter, an outline of the object control device according to the present embodiment will be given with reference to FIGS. 2 to 5.

FIGS. 2A and 2B are explanatory diagrams of processing in a case where the object control device according to the embodiment of the present invention hides a virtual object in accordance with a user movement. FIG. 2A shows a virtual reality space as viewed by the user when the user performs a movement of reaching out a hand, and FIG. 2B shows the virtual reality space as viewed by the user after a movement of reaching out a hand is performed by the user.

In the example shown in FIG. 2A, a user 201 makes a movement (move) of reaching out a hand based on a notion that "a mobile phone 203 has received a voice call and therefore must be picked up immediately". In this case, since a virtual object group 202 is displayed in front of the mobile phone 203, the virtual object group 202 presents an obstacle when the user 201 makes a movement of picking up the mobile phone 203.

Figure 3B:
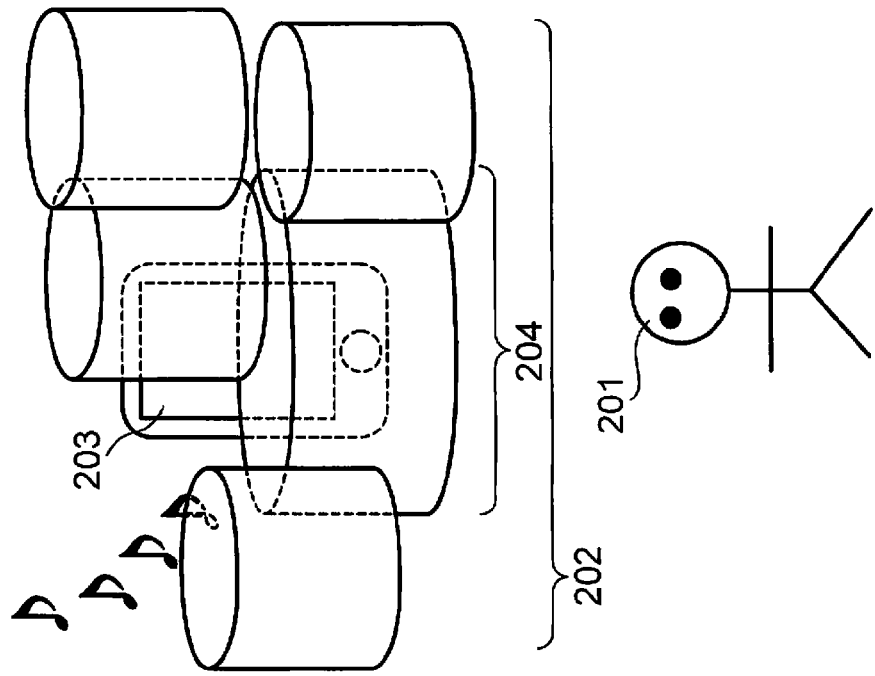
FIGS. 3A and 3B are explanatory diagrams of a case where the object control device according to the embodiment of the present invention continues displaying a virtual object in accordance with a user movement.
Figure 3A:
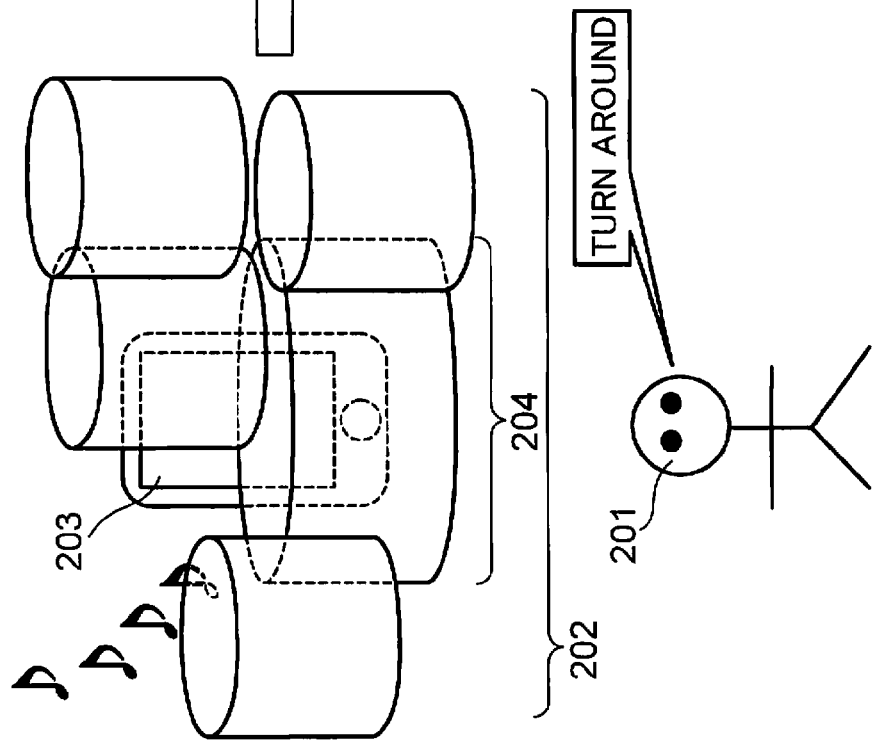

FIGS. 3A and 3B are explanatory diagrams of a case where the object control device according to the embodiment of the present invention continues displaying a virtual object in accordance with a user movement. FIG. 3A shows a virtual reality space as viewed by the user 201 when the user 201 performs a movement of turning the face around, and FIG. 3B shows the virtual reality space as viewed by the user 201 after a movement of turning the face around has been performed by the user 201.

In the example shown in FIG. 3A, a user 201 faces around to the mobile phone 203 based on a notion of confirming that an e-mail has been received by the mobile phone 203. When the mobile phone 203 receives an e-mail, the user 201 need not immediately check contents of the e-mail. Therefore, the virtual object group 202 displayed in front of the mobile phone 203 does not pose an obstacle to the user 201.

In other words, in the example shown in FIG. 2A, it is convenient for the user 201 to have the virtual object group 204 superimposed on the mobile phone 203 hidden. Furthermore, in the example shown in FIG. 3A, maintaining the display of the virtual object group 204 superimposed on the mobile phone 203 is favorable because a sense of presence in the virtual reality space can be imparted to the user 201.

Therefore, in the present embodiment, when there is a need for the user 201 to make some kind of movement with respect to the mobile phone 203 as shown in FIG. 2A, the virtual object group 204 superimposed on the mobile phone 203 is hidden as shown in FIG. 2B.

On the other hand, when there is no need for the user 201 to make some kind of movement with respect to the mobile phone 203 as shown in FIG. 3A, display of the virtual object group 204 superimposed on the mobile phone 203 is maintained as shown in FIG. 3B.

Figure 4B:
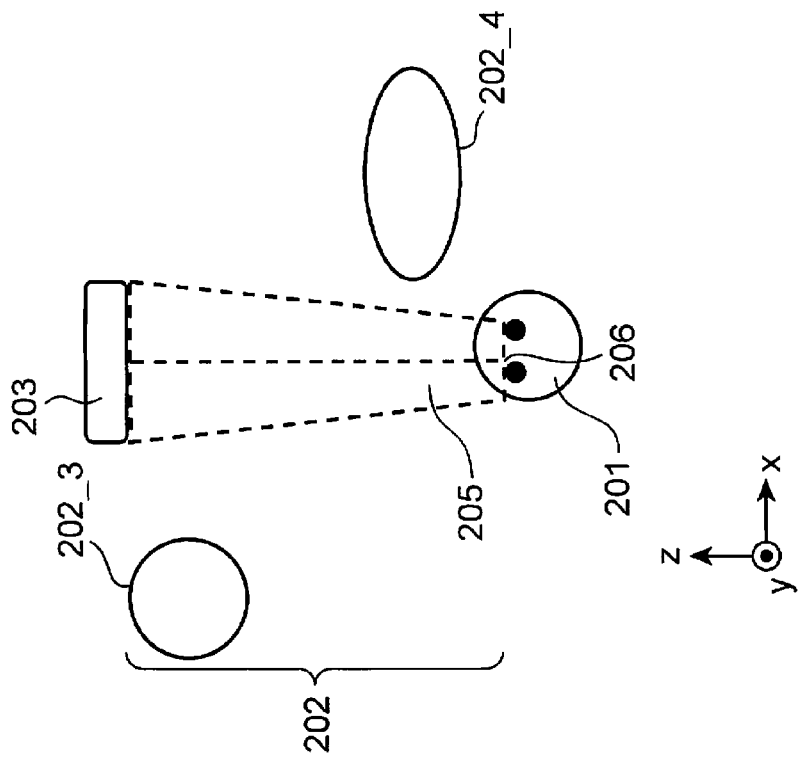
FIGS. 4A and 4B are diagrams showing FIGS. 2A and 2B from above.
Figure 4A:
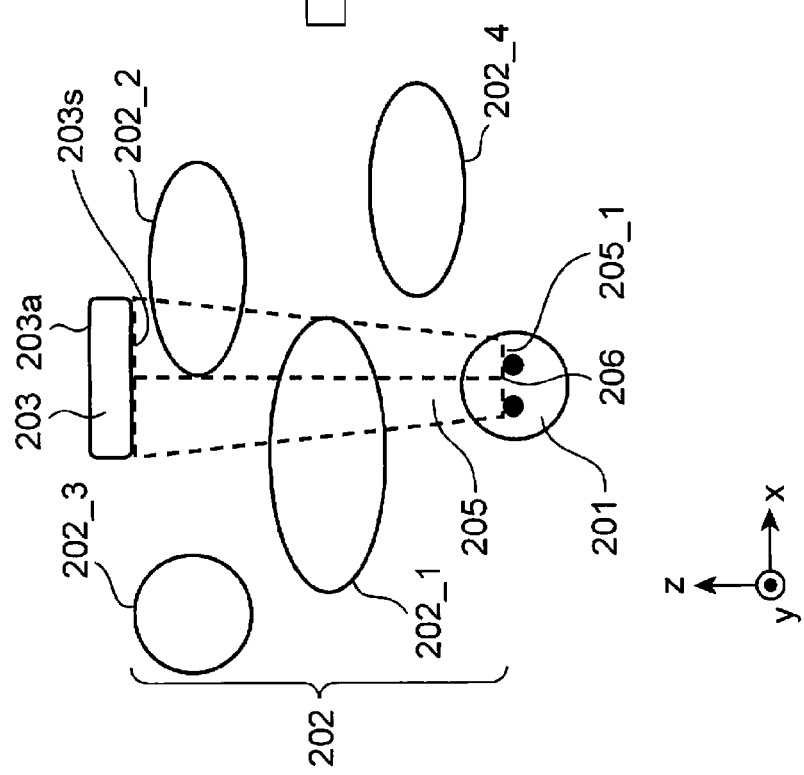

FIGS. 4A and 4B are diagrams of FIGS. 2A and 2B seen from above. A trapezoidal region enclosed by a dashed line in FIGS. 4A and 4B is a field-of-view region 205 of the user 201 in which the mobile phone 203 is blocked by a virtual object. The field-of-view region 205 is shown in a top view to have a trapezoidal shape which becomes wider from the user 201 toward the mobile phone 203. In FIG. 4A, among the virtual object group 202, virtual objects 202_1 and 202_2 partially exist in the field-of-view region 205 and therefore block the field of view of the user 201 when the user 201 views the mobile phone 203. Therefore, in the present embodiment, as shown in FIG. 4B, the virtual objects 202_1 and 202_2 are hidden. Moreover, while the field-of-view region 205 is shown flat in FIGS. 4A and 4B, the field-of-view region 205 exists so as to become wider from the user 201 toward the mobile phone 203 even in a side view and is actually a three-dimensional region.

Figure 16:
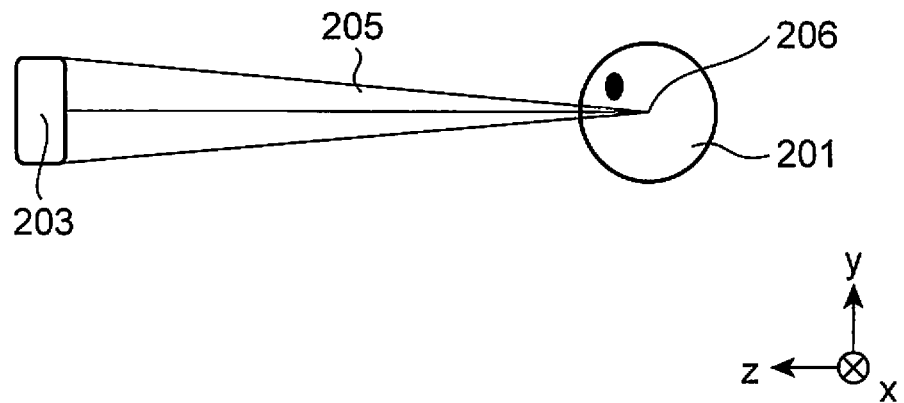
FIG. 16 is a diagram showing a field-of-view region in a lateral view.

FIG. 16 is a diagram showing the field-of-view region 205 from the side (from an x direction side). As shown in FIG. 16, it is apparent that the field-of-view region 205 has a shape which becomes wider in a triangular pattern from the user 201 toward the mobile phone 203 in a side view. In other words, the field-of-view region 205 has a shape whose sectional area gradually increases from the user 201 toward the mobile phone 203. Therefore, the field-of-view region 205 is a region which simulates the field of view of the user 201 when the user 201 views the mobile phone 203.

Figure 5A:
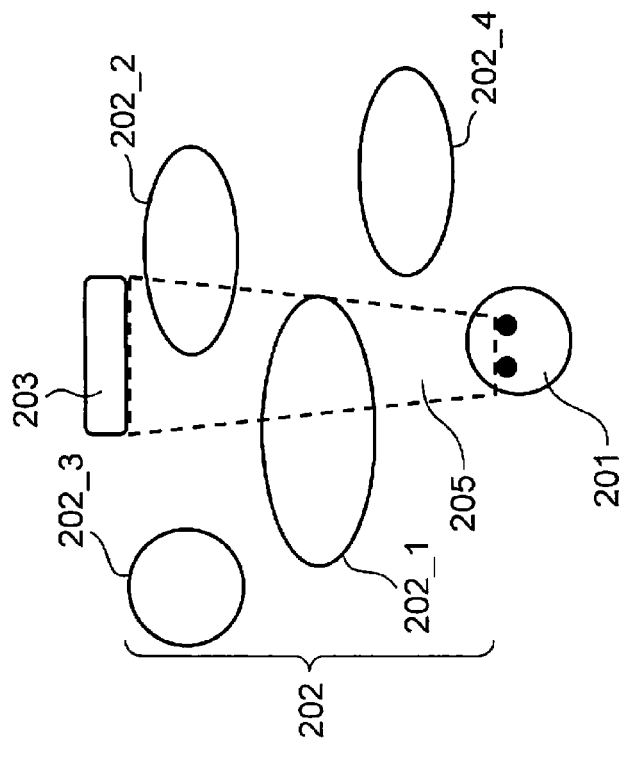
FIGS. 5A and 5B are diagrams showing FIGS. 3A and 3B from above.
Figure 5B:
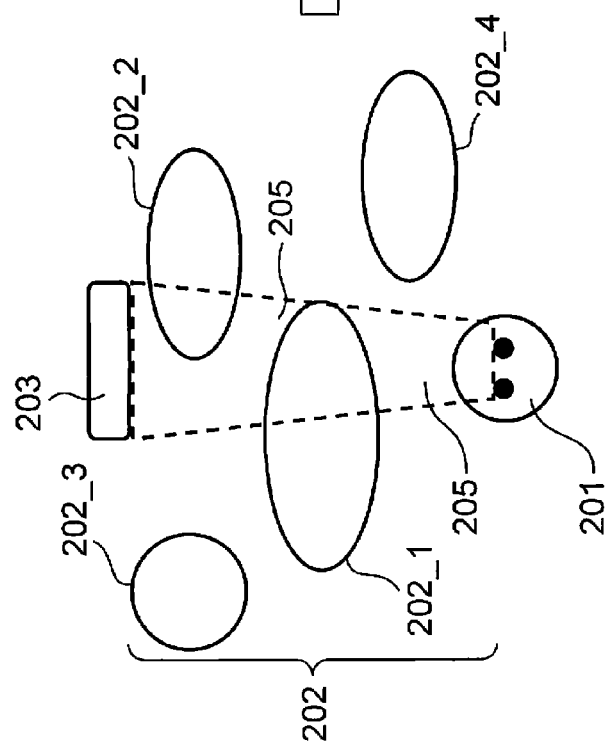

FIGS. 5A and 5B are diagrams showing FIGS. 3A and 3B from above. In FIG. 5A, while the virtual objects 202_1 and 202_2 which block the mobile phone 203 are partially included in the field-of-view region 205, the virtual objects 202_1 and 202_2 are not hidden as shown in FIG. 5B. The object control device according to the present embodiment realizes the processing described above.

In order to realize the processing described above, when a state of a real object changes, the object control device according to the present embodiment determines whether or not to hide a virtual object that blocks the real object whose state has changed depending on a movement made by the user and on the state change of the real object. Specifically, the present object control device identifies a priority corresponding to the movement made by the user from object display determination information in which priorities are associated in advance to various movements of the user. In addition, a priority corresponding to a state of the real object whose state has changed is identified from object attribute information in which priorities are associated in advance to various states of the real object. Furthermore, by comparing the two identified priorities, a determination is made on whether or not to hide a virtual object displayed superimposed on a real object whose state has changed.

(Functional Configuration)

Figure 1:
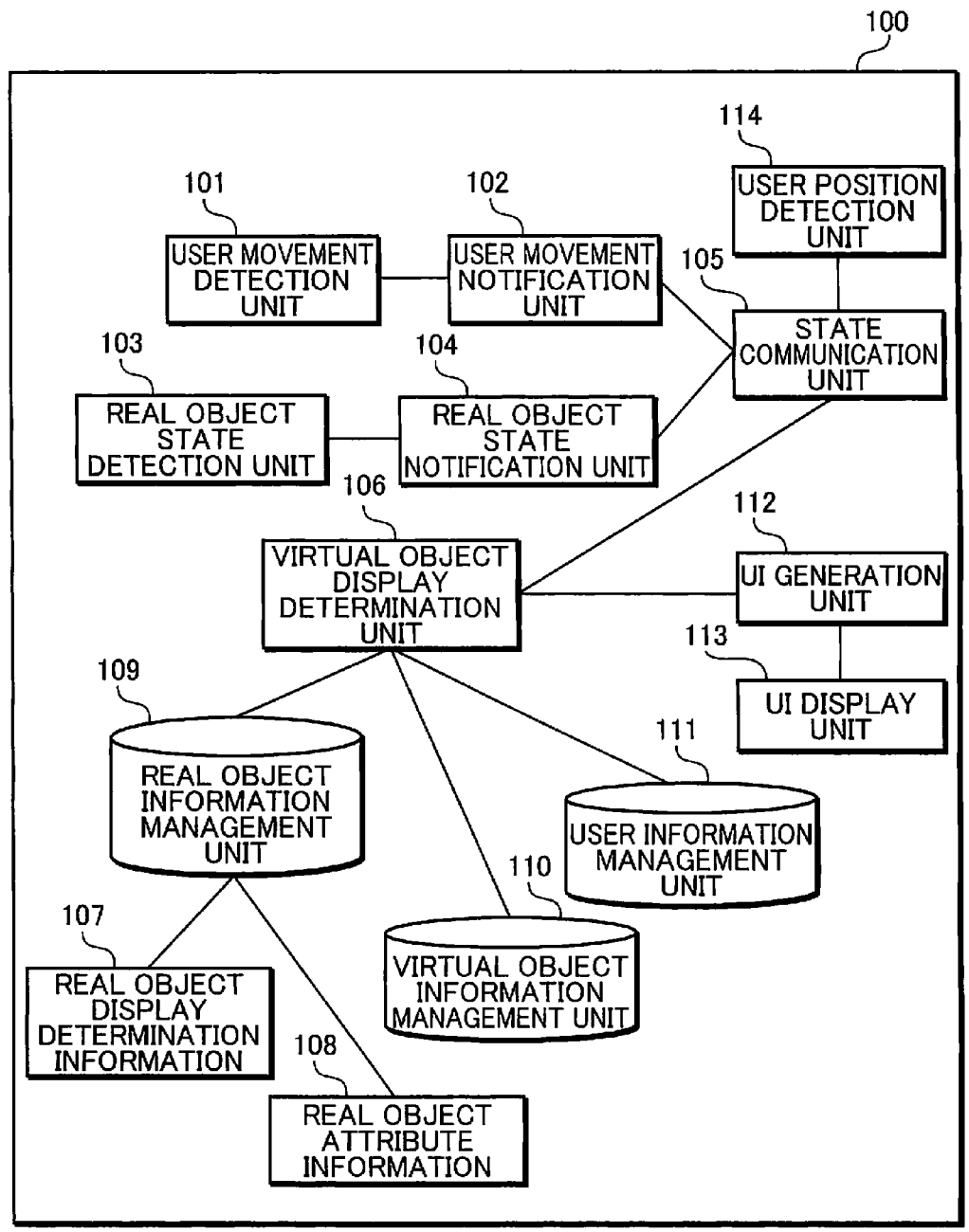
FIG. 1 is a functional block diagram of an object control device according to an embodiment of the present invention.

Next, a functional configuration of the object control device according to the embodiment of the present invention will be described. FIG. 1 is a functional block diagram of an object control device 100 according to the embodiment of the present invention. The object control device 100 comprises a user movement detection unit 101, a user movement notification unit 102, a real object state detection unit 103, a real object state notification unit 104, a state communication unit 105, a virtual object display determination unit 106, a real object information management unit 109, a virtual object information management unit 110, a user information management unit 111, a UI (user interface) generation unit 112, a UI display unit 113, and a user position detection unit 114.

The user movement detection unit 101 is constituted by a non-contact motion sensor such as Kinect (registered trademark) and detects a user movement. In this case, for example, a motion sensor comprises an imaging unit and a processing unit and is arranged around the user. The imaging unit comprises, for example, an infrared irradiating element, an infrared camera, and an RGB camera, and irradiates infrared light toward the user and captures range images of the user at a predetermined frame rate. In this case, a range image refers to an image containing a depth component in addition to R, G, and B color image components.

The processing unit extracts characteristic sites that constitute a human body from a range image using training data stored in advance, pieces the extracted sites together to generate a framework (skeleton) of the human body, and detects movement of the skeleton. In addition, when the movement of the skeleton is consistent with a movement pattern set in advance, the processing unit determines that a user movement has been detected. In this case, "tilting the head", "turning the body around", "reaching out a hand", or the like correspond to a movement pattern set in advance.

In the present embodiment, when a movement detection request is issued from the virtual object display determination unit 106, the user movement detection unit 101 detects a user movement by determining which movement pattern set in advance a movement of the skeleton corresponds to.

The user movement notification unit 102 notifies user movement information indicating a user movement detected by the user movement detection unit 101 to the state communication unit 105. Specifically, when a movement detection request is issued from the virtual object display determination unit 106, the user movement notification unit 102 notifies the movement detection request to the user movement detection unit 101 and causes the user movement detection unit 101 to detect a user movement. In addition, the user movement notification unit 102 hands over user movement information notified by the user movement detection unit 101 to the state communication unit 105. In this case, a user movement (such as "tilting the head" described above) detected by the user movement detection unit 101 is described in the user movement information. Moreover, when the user movement detection unit 101 is unable to detect a user movement, "do nothing" is described in the user movement information.

The real object state detection unit 103 is constituted by, for example, a state detection sensor capable of detecting a change in a state of an object (a real object) existing around the user, and detects a change in the state of the real object. In this case, for example, the state detection sensor is mounted to a head mounted display and comprises a depth sensor, a microphone, and a processing unit. The depth sensor comprises an infrared emitting element, an infrared camera, and an RGB camera and, for example, captures range images including a real object positioned in front of a field of view of the user at a predetermined frame rate.

The microphone detects ambient sound of the user. For example, the processing unit extracts a shape pattern of each real object included in a range image, determines which of shape patterns set in advance for each of real object types the extracted shape pattern corresponds to, and recognizes each real object. In this case, examples of real object types include digital household electrical appliances such as a mobile phone, a personal computer, a smartphone, a tablet-type device, a television set, and a DVD recorder, and household electrical appliances such as a cooktop, a light fixture, a refrigerator, a washing machine, and a microwave oven.

The processing unit uses range images of respective frames and audio signals outputted from the microphone to monitor whether or not a state of the recognized real object has changed. For example, when the processing unit has recognized a mobile phone as a real object and a sound indicating a ringtone of the mobile phone has been detected by the microphone, the processing unit determines that the state of the mobile phone has changed and notifies state change information to the real object state notification unit 104.

In the case of a mobile phone, for example, information such as "ringtone sounds" or "ringtone stops" is described in state change information. Meanwhile, in a case where a cooktop is recognized as a real object and a sound indicating that a pot is boiling over is detected by the microphone, it is determined that a state of the cooktop has changed. In this case, for example, "boilover has occurred" is described in the state change information.

While the real object state detection unit 103 detects a change in the state of a real object by monitoring range images and audio signals in the description above, the present invention is not limited thereto. For example, in the case of a cooktop, the real object state detection unit 103 may detect that the state of the cooktop has changed when a range image shows a state where a liquid in a pot is boiling over.

In addition, the real object state detection unit 103 may judge that the state of a mobile phone has changed when a luminance of a display of the mobile phone has changed from a dark state to a bright state in a range image. In this case, for example, "display has become brighter" is described in the state change information.

Furthermore, with a digital household electrical appliance, an Internet server which manages the digital household electrical appliance may sometimes distribute software to the digital household electrical appliance in order to upgrade the version of the software. In this case, the server may be configured to issue a software version upgrade notification and the real object state detection unit 103 may be configured to detect a change in the state of the digital household electrical appliance based on the notification.

As described above, the real object state detection unit 103 detects a change in the state of a recognized real object using monitoring methods in accordance with the type of the real object.

Moreover, the real object state detection unit 103 assigns an ID to each recognized real object and describes a relevant ID and a relevant type in the state change information. As a result, other blocks can readily recognize which real object the state change information is related to. Furthermore, the real object state detection unit 103 describes position data and size data of a real object in the state change information. As a result, other blocks can readily recognize a position and a size of a real object whose state has changed.

In this case, for example, a position of the center of gravity of a real object in a virtual reality space can be adopted as the position data. In the present embodiment, the depth sensor constituting the real object state detection unit 103 is attached to a head mounted display worn by a user. Therefore, a virtual reality space has its origin at a position of the depth sensor and is defined by three perpendicular axes: an x axis that is a horizontal direction of the depth sensor, a y axis that is a vertical direction of the depth sensor, and a z axis that is a depth direction perpendicular to an acceptance surface of the depth sensor. Consequently, values of the x axis, the y axis, and the z axis at the position of the center of gravity of a real object included in a range image are adopted as position data of the real object. In addition, the origin represents a current position of the user. Hereinafter, a virtual reality space having its origin at a current position of the user will be referred to as a local coordinate system, and a virtual reality space in reference to a point where the virtual reality space exists will be referred to as a global coordinate system. A global coordinate system is also defined by three perpendicular axes. In this case, for example, the three perpendicular axes of a global coordinate system respectively define a latitude, a longitude, and a height.

Furthermore, as for a size of a real object, for example, a cuboid that circumscribes a real object is applied to a range image, and position data of the six vertices of the cuboid is adopted as the size of the real object.

The real object state notification unit 104 notifies state change information notified by the real object state detection unit 103 to the state communication unit 105.

The state communication unit 105 notifies the user movement information notified by the user movement notification unit 102 and the state change information notified by the real object state notification unit 104 to the virtual object display determination unit 106.

Based on the user movement information and the state change information notified by the state communication unit 105, the virtual object display determination unit 106 determines whether or not to change the display mode of a virtual object so as to expose a real object whose state has changed.

For changing display modes, for example, a mode involving hiding a virtual object is adopted. However, this is just one example and, for example, a mode involving displacing a display position of a virtual object so as to expose a real object whose state has changed may be adopted for changing display modes.

Specifically, the virtual object display determination unit 106 identifies a priority corresponding to a user movement indicated by the user movement information notified by the state communication unit 105 from real object display determination information 107 and, at the same time, identifies a priority corresponding to a state change indicated by the state change information notified by the state communication unit 105 from real object attribute information 108, and by comparing the two identified priorities, determines whether or not to change the display mode of a virtual object.

The real object display determination information 107 and the real object attribute information 108 are stored in a storage device and managed by the real object information management unit 109.

The real object display determination information 107 is information in which a user movement and a priority are associated with each other. FIG. 6 is a diagram showing an example of the real object display determination information 107. The real object display determination information 107 comprises a user movement field and a priority field. User movements set in advance are stored in the user movement field. In the example shown in FIG. 6, "do nothing", "turn head", "turn body", "reach out hand", and "approach" are adopted as user movements. However, these are just examples and other movements may be adopted. Although the user movements shown in FIG. 6 are all related to moves made by a user, the present invention is not limited thereto and a sound vocalized by a user and a movement involving a user moving an object may be adopted as user movements.

Priorities set in advance in correspondence to the respective user movements are stored in the priority field. In the example shown in FIG. 6, a priority is set with respect to each user movement, such as a priority of "1" set to "do nothing" and a priority of "2" set to "turn head". Moreover, a priority order is shown in which the greater the value, the higher the priority. In other words, priorities are defined such that the higher the priority of a movement performed by a user, the greater the possibility of the user performing some kind of movement with respect to a real object whose state has changed.

The real object attribute information 108 is information in which a state change and a priority are associated with each other. FIG. 7 is a diagram showing an example of the real object attribute information 108. The example shown in FIG. 7 represents the real object attribute information 108 of a mobile phone. The real object attribute information 108 comprises a field for information indicating a type of a real object, a field for "state" which indicates a change in the state of the real object, a field for "position" which indicates a current position of the real object, and a field for "size" which indicates a size of the real object.

In the example shown in FIG. 7, "ringtone sounds" is described in the state field and "4" is described as a priority, thereby assigning a priority of "4" to the state change of "ringtone sounds". A priority with a numerical value set in advance is assigned to each state change of a real object, and the greater the value, the higher the priority. Moreover, while only a priority corresponding to one state change, "ringtone sounds", is defined in the example shown in FIG. 7, the present invention is not limited thereto and priorities may be set in advance for each of a plurality of state changes. In the case of a mobile phone, other examples of state changes may include "ringtone stops", "luminance of display becomes brighter", and "version of software has been upgraded".

In addition, while the real object attribute information 108 of a mobile phone is shown in FIG. 7, the real object information management unit 109 may manage real object attribute information 108 corresponding to other types of real objects.

Position data of a real object in the local coordinate system is described in the position field, and size data of the real object is described in the size field shown in FIG. 7. The position data and the size data are updated based on state monitoring information periodically transmitted from the real object state detection unit 103.

For example, state monitoring information includes an ID of each real object, a type of each real object, position data of each real object, and size data of each real object as recognized by the real object state detection unit 103.

Upon initially receiving state monitoring information, the real object information management unit 109 identifies real object attribute information 108 of a same type as a real object type, connects an ID to the identified real object attribute information 108, and generates real object attribute information 108 for each ID.

In addition, every time state monitoring information is received, the real object information management unit 109 uses the ID as a key to write position data and size data included in the state monitoring information into the position and size fields of corresponding real object attribute information 108. Accordingly, most recent position data and size data of a real object is written into the position and size fields of the real object attribute information 108. Moreover, when real object attribute information 108 of the same type as the real object type included in state monitoring information does not exist, the real object information management unit 109 may generate real object attribute information 108 which only includes an ID, position data, and size data. The state monitoring information is notified by the real object state detection unit 103 to the virtual object display determination unit 106 via the real object state notification unit 104 and the state communication unit 105.

In the present embodiment, when a priority identified from the real object display determination information 107 is equal to or higher than a priority identified from the real object attribute information 108, the virtual object display determination unit 106 makes a determination to change the display mode of a virtual object. In the examples of FIGS. 6 and 7, for example, if the ringtone of the mobile phone has sounded and the user makes a movement of reaching out a hand, a priority of "4" is identified from the real object display determination information 107 shown in FIG. 6 and a priority of "4" is identified from the real object attribute information 108 shown in FIG. 7. In this case, the priority identified from the real object display determination information 107 is equal to or higher than the priority identified from the real object attribute information 108. Therefore, the virtual object display determination unit 106 makes a determination to hide the virtual object.

Meanwhile, if the ringtone of the mobile phone has sounded and the user makes a movement of turning the head, a priority of "2" is identified from the real object display determination information 107 shown in FIG. 6 and a priority of "4" is identified from the real object attribute information 108 shown in FIG. 7. In this case, the priority identified from the real object display determination information 107 is lower than the priority identified from the real object attribute information 108. Therefore, the virtual object display determination unit 106 makes a determination not to hide the virtual object.

As described above, instead of uniformly hiding a virtual object when the state of a real object has changed, a virtual object is hidden only when a comparison between a state of a real object and a user movement reveals that there is a high possibility that the user is to perform some kind of movement (for example, a reaching movement) with respect to the real object whose state has changed.

Accordingly, since display of a virtual object is maintained to the extent possible, a sense of presence in the virtual reality space can be imparted to the user. On the other hand, when the possibility that the user is to perform some kind of movement with respect to the real object whose state has changed is high, if a virtual object is displayed in front of the real object, the virtual object displayed in the front blocks the field of view of the user and makes it difficult for the user to perform a movement with respect to the real object whose state has changed. Therefore, the virtual object is hidden when there is a high possibility that the user is to perform some kind of movement with respect to the real object whose state has changed. Accordingly, the user can readily perform some kind of action with respect to the real object whose state has changed.

The virtual object display determination unit 106 favorably extracts a virtual object that exists at position which blocks the field of view of the user with respect to a real object whose state has changed and hides the extracted virtual object.

Specifically, as shown in FIG. 4A, the virtual object display determination unit 106 sets a region enclosed by a real object (the mobile phone 203) whose state has changed and the current position 206 of the user 201 as a field-of-view region 205, and hides the virtual objects 202_1 and 202_2 which are at least partially included in the field-of-view region 205. Accordingly, since only the virtual objects 202_1 and 202_2 which block the field of view of the user are hidden and remaining virtual objects are displayed, a sense of presence of the virtual reality space can be imparted to the user due to the presence of the remaining virtual objects.

In this case, the virtual object display determination unit 106 first identifies position data and size data of the mobile phone 203 that is a real object whose state has changed from state change information. Subsequently, the virtual object display determination unit 106 identifies a current position and a current orientation of the user 201 in the global coordinate system from user position information managed by the user information management unit 111, and transforms the position data of the mobile phone 203 to the global coordinate system using the identified current position and current orientation of the user 201.

Next, the virtual object display determination unit 106 sets a cuboid 203a that circumscribes the mobile phone 203 based on the size data of the mobile phone 203. The virtual object display determination unit 106 then sets a side 205_1 which is centered at the current position 206 of the user 201 and which extends by a certain distance toward both sides in the x direction. Next, the virtual object display determination unit 106 sets a region enclosed by a user-side surface 203s of the cuboid 203a and the side 205_1 as the field-of-view region 205. Accordingly, the field-of-view region 205 becomes a region having a trapezoidal shape when viewed in the y direction and a triangular shape when viewed in the x direction.

Subsequently, the virtual object display determination unit 106 extracts a virtual object that is a display object from virtual objects managed by the virtual object information management unit 110, reads out position data and size data of the extracted virtual object from the virtual object information management unit 110, and sets a cuboid that circumscribes the virtual object. In this case, for example, position data of virtual objects managed by the virtual object information management unit 110 is position data in the global coordinate system. The virtual object display determination unit 106 then extracts a virtual object positioned within a certain region in front of the user 201 from the current position of the user 201 as a virtual object that is a display object. In the example shown in FIG. 4A, four virtual objects 202_1 to 202_4 are extracted as virtual objects that are display objects.

Subsequently, the virtual object display determination unit 106 sets cuboids that respectively circumscribe the virtual objects 202_1 to 202_4, makes a determination to hide virtual objects having a partial region of the cuboid included in the field-of-view region 205, and makes a determination to display the remaining virtual objects.

In the example shown in FIG. 4A, since the virtual objects 202_1 and 202_2 exist in the field-of-view region 205, a determination is made to hide the virtual objects 202_1 and 202_2, and a determination is made to display the virtual objects 202_3 and 202_4. The virtual object display determination unit 106 then notifies a determination result of hiding the virtual objects 202_1 and 202_2 and displaying the virtual objects 202_3 and 202_4 to the UI generation unit 112.

Returning now to FIG. 1, the real object information management unit 109 manages real object display determination information 107 and real object attribute information 108.

The virtual object information management unit 110 manages virtual object management information which includes position data and size data of a virtual object. It is assumed that, for example, position data in the global coordinate system has been adopted and set in advance as the position data of a virtual object. In addition, as the size data of a virtual object, coordinates of the six vertices of a cuboid that circumscribes the virtual object are adopted.

The user information management unit 111 manages user information including a current position, a current orientation, and a size of a user in the global coordinate system. The user information management unit 111 manages user position information according to the user position information periodically notified by the user position detection unit 114. In addition, the user information management unit 111 manages a size of a user by having the user input size information such as height and weight in advance.

The user position detection unit 114 comprises, for example, a GPS sensor, an acceleration sensor, an electronic compass, and the like mounted on the head mounted display, detects a current position and a current orientation of a user, and periodically notifies user position information indicating the current position and the current orientation of the user to the state communication unit 105.

For example, when the head mounted display is being worn, the user position detection unit 114 acquires position data of the user in the global coordinate system from the GPS sensor and acquires a current orientation of the user in the global coordinate system from the electronic compass. Thereafter, by integrating acceleration data which indicates an acceleration of the user and which is periodically outputted from the acceleration sensor, the user position detection unit 114 detects a current position and a current orientation of the user in the global coordinate system. Moreover, since acceleration data is expressed as a three-dimensional vector, by integrating an amount of movement and an amount of orientation variation of the user, the current position and the current orientation of the user can be identified. In addition, user position information notified to the state communication unit 105 is notified to the user information management unit 111 via the virtual object display determination unit 106. While current position data and orientation of a user in the global coordinate system are acquired by a GPS sensor and an electronic compass in the description given above, by having the user operate an input device, current position data and orientation of the user in the global coordinate system may be inputted by the user.

The UI generation unit 112 generates a UI (user interface) to be presented to the user based on a determination result of the virtual object display determination unit 106. Specifically, the UI generation unit 112 reads out virtual object management information of a virtual object determined to be displayed by the virtual object display determination unit 106 from the virtual object information management unit 110, and generates two-dimensional graphical data of the virtual object. The UI generation unit 112 then writes the generated graphical data into a frame buffer of the UI display unit 113 as a UI. A color image component captured by the RGB camera of the real object state detection unit 103 or, in other words, a color image of the real space is written into the frame buffer. Accordingly, an image of a virtual reality space in which a virtual object is superimposed on a real space image is generated.

The UI display unit 113 comprises, for example, a display panel and a frame buffer, and superimposes a real space image and a virtual object on each other to display an image of a virtual reality space. In this case, a color image component captured by the RGB camera of the real object state detection unit 103 and a UI generated by the UI generation unit 112 are written into the frame buffer of the UI display unit 113 at a predetermined frame rate, and the display panel displays the image written into the frame buffer.

Figure 15:
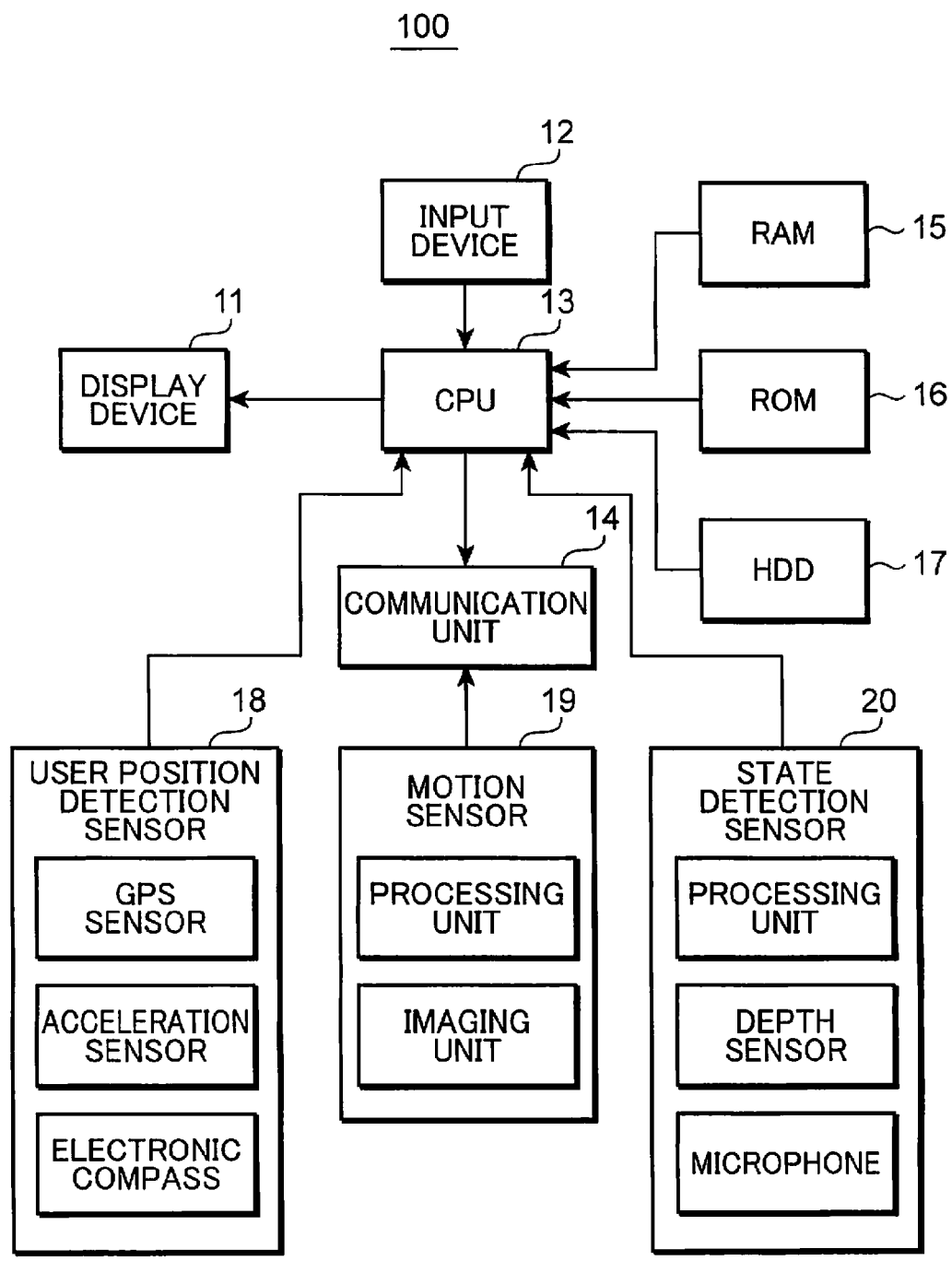
FIG. 15 is a block diagram showing a hardware configuration of the object control device according to the embodiment of the present invention.

FIG. 15 is a block diagram showing a hardware configuration of the object control device 100 according to the embodiment of the present invention. The object control device 100 comprises a display device 11, an input device 12, a CPU 13, a communication unit 14, a RAM 15, a ROM 16, a hard disk drive (HDD) 17, a user position detection sensor 18, a motion sensor 19, and a state detection sensor 20.

The display device 11 is constituted by a liquid crystal display device or the like and displays images of a virtual reality space. The input device 12 is constituted by a keyboard or the like and accepts input operations from a user. The CPU 13 is responsible for overall control of the object control device 100. The communication unit 14 is constituted by a wired or wireless communication circuit, and receives data detected by the motion sensor 19 as well as data transmitted from the Internet.

The RAM 15, the ROM 16, and the hard disk drive 17 constitute a storage device which stores an object control program. The user position detection sensor 18 comprises a GPS sensor, an acceleration sensor, and an electronic compass, and constitutes the user position detection unit 114 shown in FIG. 1. The motion sensor 19 comprises a processing unit and an imaging unit, and constitutes the user movement detection unit 101 shown in FIG. 1. The state detection sensor 20 comprises a processing unit, a depth sensor, and a microphone, and constitutes the real object state detection unit 103 shown in FIG. 1.

The user movement notification unit 102, the real object state notification unit 104, the virtual object display determination unit 106, and the UI generation unit 112 shown in FIG. 1 are programs included in an object control program stored in the storage device, and are components that are read out from the storage device and executed by the CPU 13.

In addition, the state communication unit 105 shown in FIG. 1 is constituted by the communication unit 14 and a program which is included in the object control program and which controls the communication unit 14, and is a components that is read out from the storage device and executed by the CPU 13. Furthermore, the real object information management unit 109, the virtual object information management unit 110, and the user information management unit 111 shown in FIG. 1 are constituted by data included in the object control program and programs that manage the data, and are components that are read out from the storage device and executed by the CPU 13.

Moreover, in FIG. 15, the user position detection sensor 18, the state detection sensor 20, and the display device 11 are attached to the head mounted display. In addition, components ranging from the input device 12 to the hard disk drive 17 are constituted by a computer carried by a user. Furthermore, the motion sensor 19 is communicably connected to the computer via the communication unit 14 and is installed around a user.

(Operations)

Figure 8:
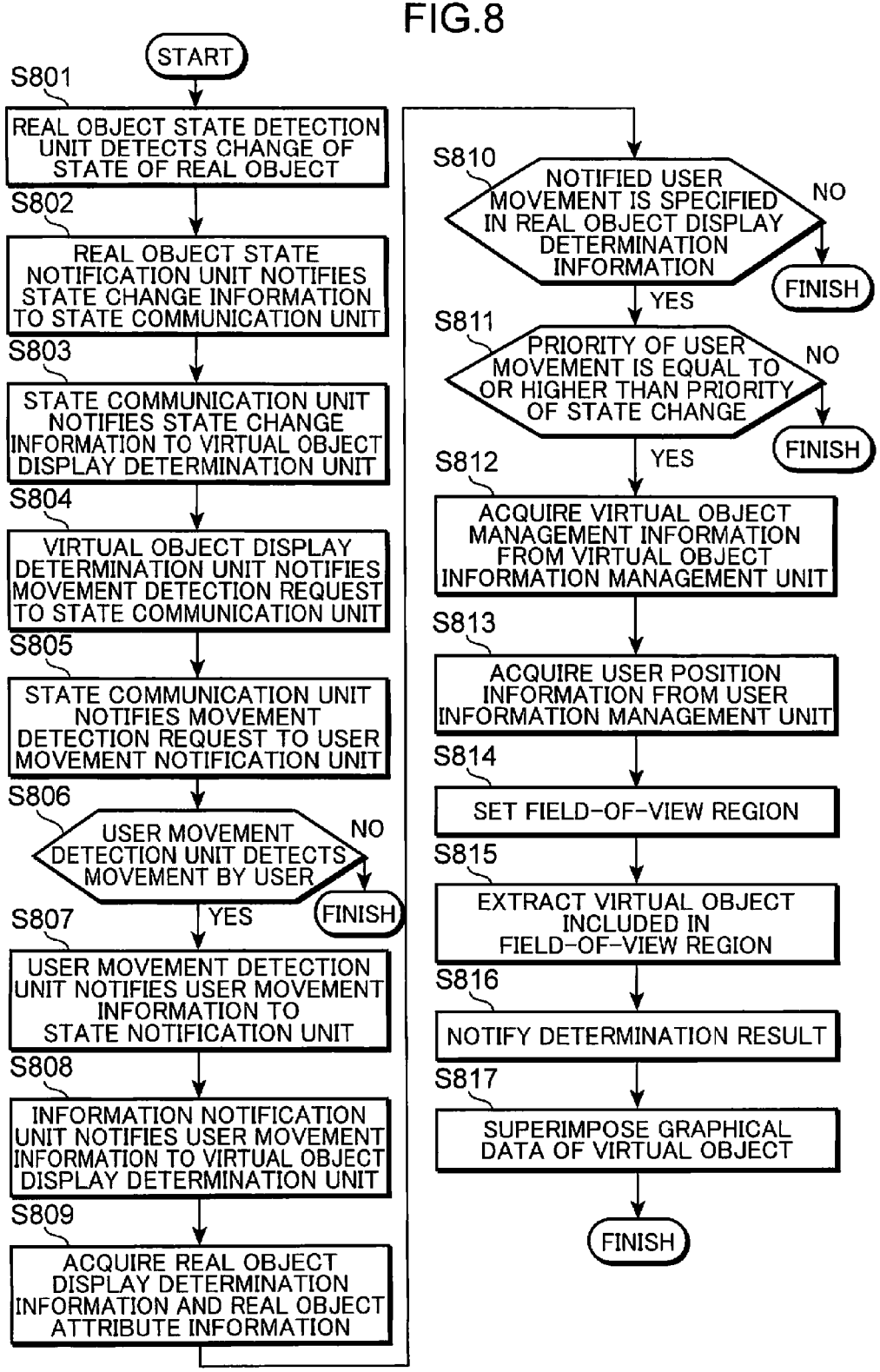
FIG. 8 is a flow chart showing operations by the object control device according to the embodiment of the present invention.

Next, operations of the object control device 100 will be described. FIG. 8 is a flow chart showing operations by the object control device 100 according to the embodiment of the present invention. Hereinafter, the situations shown in FIGS. 2 and 3 will be described as examples.

First, the real object state detection unit 103 detects a change in the state of a real object (S801), generates state change information, and notifies the state change information to the real object state notification unit 104. In the example shown in FIG. 2, since a sound generated when a voice call is received is heard from the mobile phone 203, the real object state detection unit 103 detects a state change of the mobile phone 203.

Next, the real object state notification unit 104 notifies the state change information notified by the real object state detection unit 103 to the state communication unit 105 (S802). In the example shown in FIG. 2, since the state of the mobile phone 203 has changed from a silent state to a ringing state, state change information that indicates this state change (="ringtone has sounded") is notified to the state communication unit 105.

Next, the state communication unit 105 notifies the state change information notified by the real object state notification unit 104 to the virtual object display determination unit 106 (S803).

The virtual object display determination unit 106 then issues a movement detection request and notifies the movement detection request to the state communication unit 105 (S804). Next, the state communication unit 105 notifies the movement detection request to the user movement notification unit 102 (S805).

Next, the user movement detection unit 101 is notified of the movement detection request by the user movement notification unit 102 and detects a user movement (S806). At this point, if the user movement detection unit 101 is unable to detect a user movement within a certain period of time (NO in S806), the processing is terminated.

As the certain amount of time, for example, a period of time set in advance may be adopted, or a period of time that lapses between the detection of another state change by the real object state detection unit 103 and a notification of state change information to the state communication unit 105 may be adopted.

On the other hand, if the user movement detection unit 101 is able to detect a user movement within the certain period of time (YES in S806), the user movement detection unit 101 generates user movement information indicating the detected user movement and notifies the user movement information to the state communication unit 105 via the user movement notification unit 102 (S807).

Next, the state communication unit 105 notifies the user movement information to the virtual object display determination unit 106 (S808). The virtual object display determination unit 106 acquires real object display determination information 107 and real object attribute information 108 from the real object information management unit 109 (S809).

The virtual object display determination unit 106 then determines whether or not the user movement detected by the user movement detection unit 101 is specified in the real object display determination information 107 (S810). When the virtual object display determination unit 106 determines that the user movement is specified in the real object display determination information 107 (YES in S810), processing advances to S811. On the other hand, if the user movement is not specified in the real object display determination information 107 (NO in S810), the processing is terminated.

Next, the virtual object display determination unit 106 identifies a priority corresponding to the user movement from the real object display determination information 107 and identifies a priority corresponding to the state change from the real object attribute information 108, and compares the two identified priorities with each other (S811). As a result of the comparison, if the priority of the user movement is equal to or higher than the priority of the state change (YES in S811), the processing advances to S812. On the other hand, if the priority of the user movement is lower than the priority of the state change (NO in S811), the processing is terminated.

Operations from S807 to S811 will now be described using FIGS. 2 and 3 as examples. In FIG. 2, the mobile phone 203 receives a voice call and a ringtone sounds and, accordingly, the user performs a movement of "reaching out a hand". In this case, according to the real object display determination information 107 shown in FIG. 6, the priority of the movement is "4". In addition, according to the real object attribute information 108 of a mobile phone shown in FIG. 7, a priority of "4" is set to a state change of "ringtone sounds". In this case, since the two priorities are the same, a determination of YES is made in S811 and the processing advances to S812.

Meanwhile, in the case of FIG. 3, the mobile phone 203 receives an e-mail and a ringtone sounds and, accordingly, the user performs a movement of "turning the head". In this case, according to the real object display determination information 107 shown in FIG. 6, the priority of the movement is "2". In addition, according to the real object attribute information 108 of a mobile phone shown in FIG. 7, a priority of "4" is set to the state change of the mobile phone. In this case, since the priority of the user movement is lower than the priority of the mobile phone 203, the processing is terminated.

Next, the virtual object display determination unit 106 acquires virtual object management information of a virtual object that becomes a display object from the virtual object information management unit 110 (S812). The virtual object display determination unit 106 then acquires user position information from the user information management unit 111 (S813).

Next, based on a current position and orientation of the user indicated in the user position information and on position data and size data of the real object whose state has changed which is specified in the real object attribute information 108, the virtual object display determination unit 106 sets the field-of-view region 205 shown in FIG. 4A in a virtual reality space (S814).

The virtual object display determination unit 106 then arranges virtual objects to become display objects in the virtual reality space, and extracts virtual objects included in the field-of-view region 205 among the virtual objects to become display objects (S815).

Next, the virtual object display determination unit 106 notifies a determination result for notifying virtual objects to be displayed and virtual objects to be hidden to the UI generation unit 112 (S816). The UI generation unit 112 then generates graphical data of the virtual objects to be displayed, and the UI display unit 113 superimposes the graphical data of the virtual objects onto an image of a real space in order to generate and display an image of the virtual reality space (S817).

Moreover, once the user completes a predetermined movement after the virtual objects are hidden, the object control device 100 may release the hidden state by re-displaying the hidden virtual objects.

Specifically, once the user movement that caused a virtual object to be hidden is no longer detected by the user movement detection unit 101, the virtual object display determination unit 106 may release the hidden state. More specifically, the virtual object display determination unit 106 may release the hidden state when user movement information including a description of "do nothing" is notified by the user movement detection unit 101.

In addition, for example, the virtual object display determination unit 106 defines, in advance, a particular movement for releasing the hidden state such as waving a hand a predetermined number of times. Subsequently, the virtual object display determination unit 106 may release the hidden state when the particular movement is detected by the user movement detection unit 101 and user movement information indicating the particular movement is notified.

When the hidden state is released, graphical data of virtual objects that were hidden due to their existence in the field-of-view region 205 is superimposed on an image of a real space and displayed on the UI display unit 113. In other words, an image such as that shown in FIG. 3B is displayed on the UI display unit 113.

(Other)

While virtual objects included in the field-of-view region 205 have been hidden in the present embodiment, the present invention is not limited thereto and all virtual objects may be hidden. Accordingly, when a user performs some kind of movement with respect to a real object, the user is able to find the real object to become an operation object without being blocked by virtual objects.

In addition, in S810 in FIG. 8, even if a user movement is not specified in the real object display determination information 107, a priority may be identified by approximating the user movement to a user movement specified in the real object display determination information 107.

In this case, the virtual object display determination unit 106 may cause the real object information management unit 109 to manage approximate movement information shown in FIG. 9 and approximate a user movement by referring to the approximate movement information. FIG. 9 is a diagram showing an example of approximate movement information. Approximate movement information comprises a user movement field and an approximate movement field. Any of the user movements specified in the real object display determination information 107 is stored in the user movement field. A user movement not specified in the real object display determination information 107 but is detected by the user movement detection unit 101 is stored in the approximate movement field.

In S810 in FIG. 8, when the user movement detected by the user movement detection unit 101 is not specified in the real object display determination information 107 (NO in S810), the virtual object display determination unit 106 refers to the approximate movement information shown in FIG. 9. When the detected user movement is specified in the approximate movement field, the virtual object display determination unit 106 may identify a user movement corresponding to the approximate movement and identify a priority corresponding to the identified user movement from the real object display determination information 107.

Accordingly, even if a user movement detected by the user movement detection unit 101 is not specified in the real object display determination information 107, a priority can be identified by approximating the user movement to a user movement specified in the real object display determination information 107. As a result, priorities can be identified with respect to various user movements in a more flexible manner.

Furthermore, in S815 in FIG. 8, instead of a mode in which virtual objects included in the field-of-view region 205 are hidden, the virtual object display determination unit 106 may instruct the UI generation unit 112 so that the virtual objects included in the field-of-view region 205 are relocated outside of the field-of-view region 205. In this case, for example, the virtual object display determination unit 106 may move a virtual object that is a relocation object such that a cuboid that circumscribes the virtual object does not overlap with the field-of-view region 205 to a position to which a distance of relocation of the virtual object that is a relocation object is a minimum distance while keeping a z coordinate position of the virtual object unchanged. Accordingly, a variation in the display position of the virtual object can be minimized and the virtual object can be displayed without significantly discomforting the user.

In addition, the virtual object display determination unit 106 notifies the virtual object information management unit 110 to change the position of the virtual object included in the field-of-view region 205 and causes a position of a relevant virtual object that is managed by the virtual object information management unit 110 to be changed. The virtual object display determination unit 106 then instructs the UI generation unit 112 so that a relevant virtual object is displayed at the updated virtual object position. Accordingly, when a user performs some kind of movement with respect to a real object, the user is able to find the real object to become an operation object without being blocked by virtual objects.

Moreover, in S815 in FIG. 8, when the real object attribute information 108 retains an attribute for expanding the field-of-view region 205, the virtual object display determination unit 106 may hide virtual objects included in an expanded field-of-view region in addition to those included in the field-of-view region 205. An expanded field-of-view region is a region set in a vicinity of a real object for which a state change has been detected. Accordingly, when a user performs some kind of movement with respect to a real object, the user is able to find the real object to become an operation object over a wider region without being blocked by virtual objects.

Hereinafter, an expanded field-of-view region will be described with reference to FIGS. 10, 11, 12, and 17.

FIG. 10 is a diagram showing an example of real object attribute information 108 when retaining an attribute that expands the field-of-view region 205. FIG. 10 shows that the real object attribute information 108 has an attribute "expanded region distance: L" for expanding the field-of-view region 205.

Figure 17:
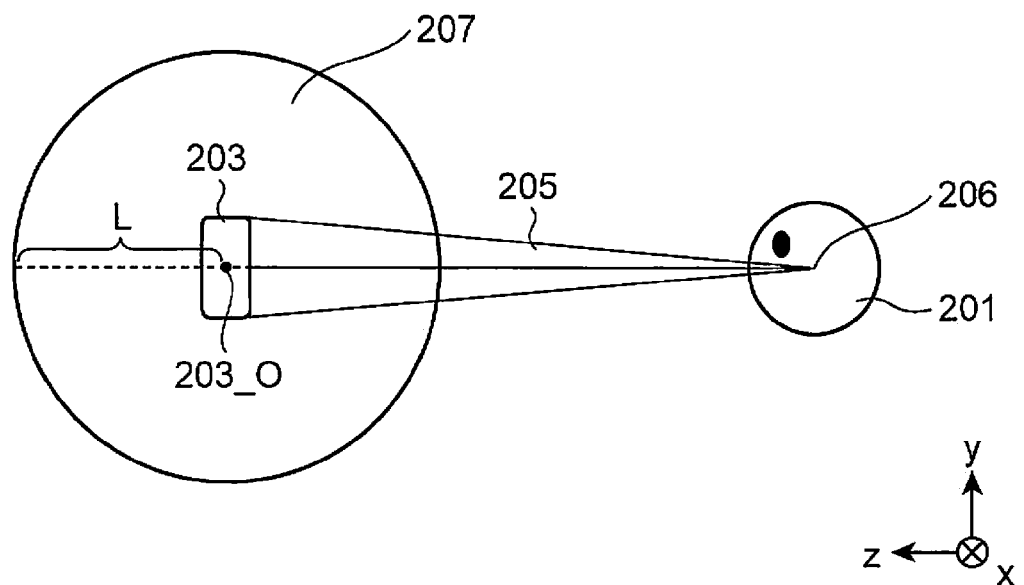
FIG. 17 is a diagram showing an expanded field-of-view region in a lateral view.
Figure 18:
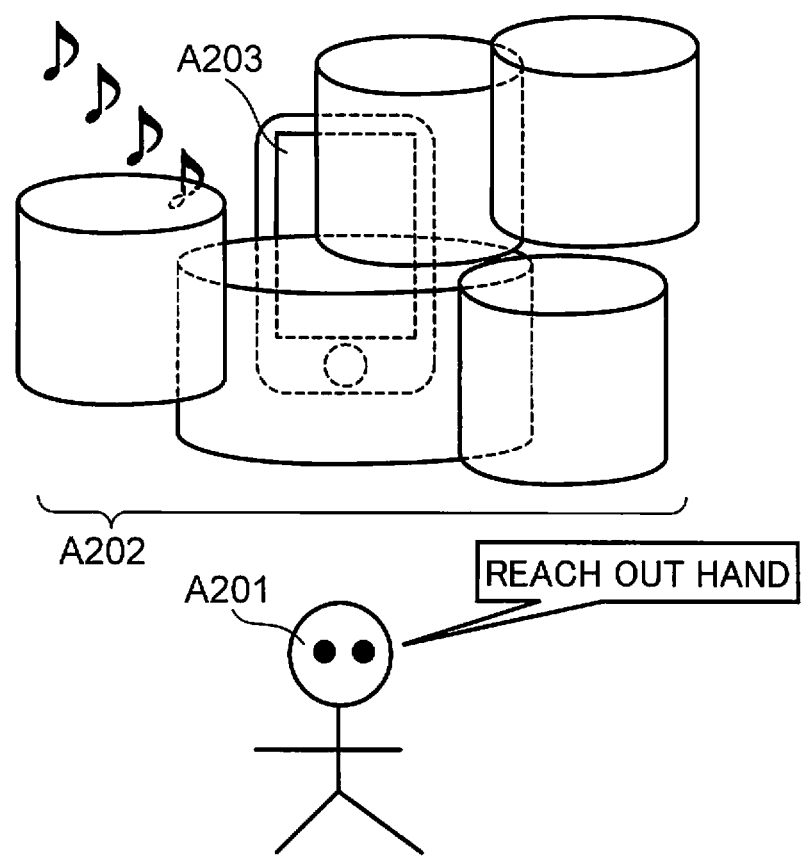
FIG. 18 is a diagram showing an example in which a real object and a virtual object are displayed superimposed in a virtual reality space.
Figure 19:
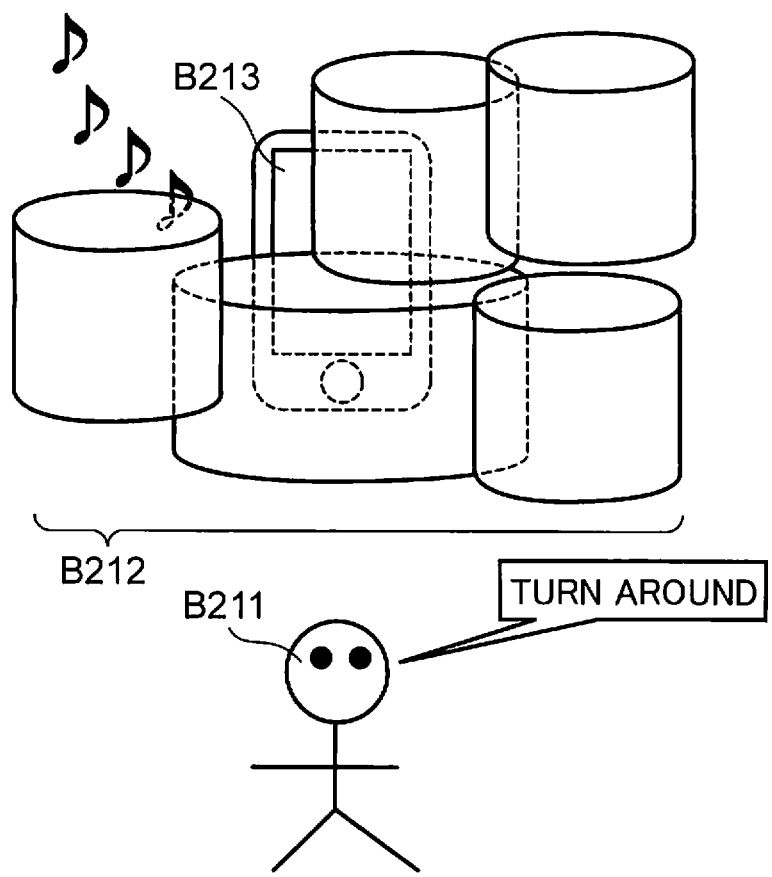
FIG. 19 is a diagram showing an example in which a real object and a virtual object are displayed superimposed in a virtual reality space.

FIG. 11 is an explanatory diagram of processing when a virtual object is hidden in accordance with a user movement in a case where the object control device 100 according to the embodiment of the present invention has set an expanded field-of-view region. FIG. 11A shows a virtual reality space as viewed by the user when the user performs a movement of reaching out a hand, and FIG. 11B shows the virtual reality space as viewed by the user after performing a movement of reaching out a hand. The difference from FIGS. 2A and 2B is that a virtual object 202_X exists behind the mobile phone 203. FIGS. 12A and 12B are diagrams showing FIGS. 11A and 11B from above. FIG. 17 is a diagram showing an expanded field-of-view region 207 from the side (from an x direction side). As shown in FIG. 12A, the virtual object 202_X positioned behind the mobile phone 203 is not included in the field-of-view region 205. Therefore, simply hiding only the virtual objects included in the field-of-view region 205 cannot prevent the virtual object 202_X from being displayed behind the mobile phone 203 and the virtual object 202_X may obstruct a movement by the user 201 for picking up the mobile phone 203.

Therefore, in order to hide the virtual object 202_X, the virtual object display determination unit 106 sets an expanded field-of-view region 207 as shown in FIG. 12B. The expanded field-of-view region 207 is a region which, in a top view, has an arc 207_2 that is set on a side of the reached-out hand of the user 201 and which has a fan-shape with a certain radius L from a center 203_O of the mobile phone 203. In this case, an expanded region distance is adopted as the certain radius L. In addition, as the center 203_O, for example, a center of the cuboid 203a that circumscribes the mobile phone 203 may be adopted, or a center of a user-side surface 203s of the cuboid 203a may be adopted. Furthermore, one side 207_1 is set parallel to a straight line connecting the current position 206 of the user 201 and the center 203_O or, in other words, parallel to the z axis.

Moreover, as shown in FIG. 17, the expanded field-of-view region 207 has a circular shape with a radius L and having a center thereof at the center 203_O in a side view. In other words, the expanded field-of-view region 207 has a fan shape in a top view and a circular shape in a side view, and is a solid that is obtained by spherically interpolating the fan shape and the circular shape.

By setting an expanded field-of-view region 207 in this manner, in addition to virtual objects included in the field-of-view region 205, the virtual object 202_X included in the expanded field-of-view region 207 is also hidden (refer to FIG. 11B). Therefore, the virtual object 202_X positioned behind the mobile phone 203 becomes hidden and the user 201 is able to perform a movement with respect to the mobile phone 203 with ease.

Figure 13:
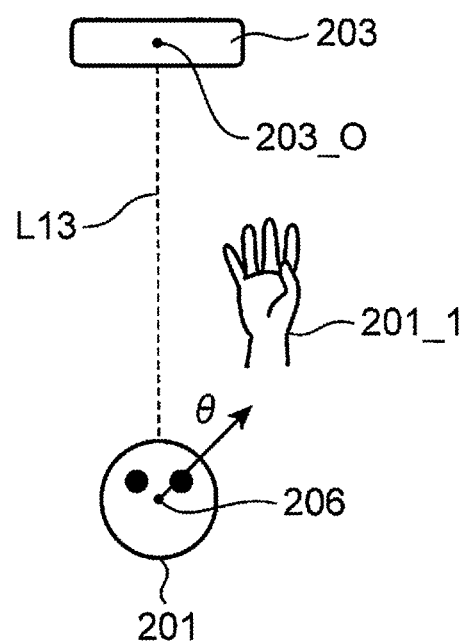
FIG. 13 is a diagram showing a movement of a hand of a user from above.

In addition, when calculating the expanded field-of-view region 207, an orientation of a hand 201_1 of the user may be acquired in step S808 and the expanded field-of-view region 207 may be set using the acquired orientation of the hand. FIG. 13 is a diagram showing a movement of the hand 201_1 of the user from above.

In the example shown in FIG. 13, the user 201 reaches out a right hand 201_1 forward. Therefore, the user movement detection unit 101 detects, in a top view, an angle θ formed between a straight line L13 that connects the center 203_O of the mobile phone 203 and the current position 206 of the user 201 and the reached-out hand 201_1 of the user 201. In this case, the user movement detection unit 101 may obtain the angle θ by projecting a skeleton representing a posture of the user 201 on an x-y plane.

In addition, in S815 in FIG. 8, since "expanded region distance: U" is described in the acquired real object attribute information 108, the virtual object display determination unit 106 determines that virtual objects existing in the expanded field-of-view region 207 are to be hidden in addition to those existing in the field-of-view region 205. In this case, the virtual object display determination unit 106 may set a cuboid that circumscribes the virtual object 202_X, and determine that the virtual object 202_X is included in the expanded field-of-view region 207 if a part of the cuboid exists in the expanded field-of-view region 207.

Figure 14:
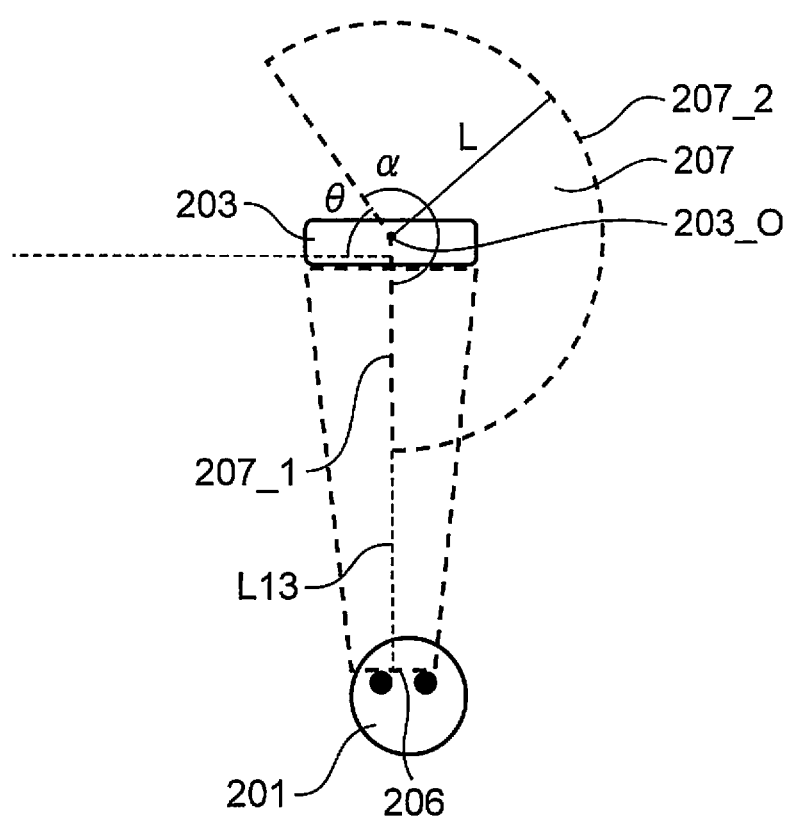
FIG. 14 is a diagram showing, from above, an expanded field-of-view region set in accordance with an orientation of a hand of a user.

Furthermore, as shown in FIG. 14, in a top view, the expanded field-of-view region 207 is set such that one side 207_1 is on the straight line L13 that connects the center 203_O of the mobile phone 203 that is a real object whose state has changed and the current position 206 of the user 201, and as the angle θ formed between the straight line L13 and the hand 201_1 increases, a central angle α decreases. Specifically, in a top view, the expanded field-of-view region 207 is set as a fan shape having a central angle α=(270−θ) degrees with respect to the side 207_1. Even in this case, as shown in FIG. 17, the expanded field-of-view region 207 may have a spherical shape with a radius of L in a side view.

Moreover, even in a case of adopting a mode of setting the expanded field-of-view region 207, a mode of relocating a position of a virtual object may be adopted instead a mode of hiding virtual objects included in the field-of-view region 205 and the expanded field-of-view region 207. In this case, a virtual object that is a relocation object may be relocated such that a cuboid that circumscribes the virtual object does not overlap with the field-of-view region 205 and the expanded field-of-view region 207 to a position to which a distance of relocation of the virtual object that is a relocation object is a minimum distance while keeping a z coordinate position of the virtual object unchanged.

In addition, the object control device 100 according to the present embodiment is typically realized as an LSI that is a semiconductor integrated circuit. Specifically, among the object control device 100, the user movement notification unit 102, the real object state notification unit 104, the state communication unit 105, the virtual object display determination unit 106, the real object information management unit 109, the virtual object information management unit 110, the user information management unit 111, and the UI (user interface) generation unit 112 may be constituted by integrated circuits.

These components may be individually configured as single chips or a single chip may be configured which includes a part of or all of these components. Although the term LSI has been used, other terms such as an IC, a system LSI, a super LSI, and an ultra LSI may be used depending on degrees of integration.

Furthermore, methods of realizing an integrated circuit are not limited to an LSI, and an integrated circuit may be realized using a dedicated circuit or a general-purpose processor. An FPGA (Field Programmable Gate Array) that can be programmed after LSI production or a reconfigurable processor that allows reconfiguration of connections and settings of circuit cells inside an LSI after LSI production may also be used.

Moreover, if techniques for realizing integrated circuits which replace LSIs should emerge due to progress made in semiconductor technology or due to derivative technology, it is obvious that the function blocks may be integrated using such techniques. The application of biotechnology or the like may potentially create such techniques.

In addition, a semiconductor chip into which the object control device 100 according to the present embodiment is integrated and a display for rendering images can be combined to construct rendering devices for various purposes. The present invention can be utilized as information rendering means in a mobile phone, a television set, a digital video recorder, a digital video camera, a car navigation system, and the like. Examples of displays that can be combined include a cathode-ray tube (CRT), flat displays such as a liquid crystal display, a PDP (plasma display panel), and an organic EL display, and projection displays such as a projector.

The technical features of the object control device according to the present invention can be summarized as follows.

(1) An object control device according to the present invention is an object control device that controls display of a virtual object in a virtual reality space, the object control device comprising: a user movement detection unit that detects a movement of a user; a user movement notification unit that notifies user movement information indicating a user movement detected by the user movement detection unit; a real object state detection unit that detects a change in a state of a real object existing in the virtual reality space; a real object state notification unit that notifies state change information indicating a change in the state of the real object detected by the real object state detection unit; a state communication unit that notifies user movement information notified by the user movement notification unit and state change information notified by the real object state notification unit; a virtual object display determination unit that determines whether or not to change a display mode of the virtual object so as to expose the real object whose state has changed based on the user movement information and the state change information notified by the state communication unit; a UI generation unit that generates a UI (user interface) to be presented to the user based on a determination result by the virtual object display determination unit; and a UI display unit that displays the UI generated by the UI generation unit.

According to the configuration described above, when a state of a real object changes, the state change of the real object is compared with a user movement, and a determination is made on whether or not to change a display mode of a virtual object so that the real object is exposed or, in other words, the real object is displayed in front. In addition, based on the determined result, a UI to be presented to the user is generated and displayed.

As described above, instead of uniformly hiding a virtual object when the state of a real object has changed, a virtual object is hidden only when a comparison between a state of a real object and a user movement indicates that there is a high possibility that the user is to perform some kind of movement with respect to the real object whose state has changed.

Accordingly, since display of a virtual object is maintained to the extent possible, a sense of presence in the virtual reality space can be imparted to the user. On the other hand, when the user performs some kind of movement with respect to a real object whose state has changed, if a virtual object is displayed in front of the real object, the virtual object displayed in the front blocks the field of view of the user to the real object and makes it difficult for the user to perform the movement. Therefore, when there is a high possibility that the user is to perform some kind of movement with respect to the real object whose state has changed, the display mode of the virtual object is changed so that the real object is displayed in front. Accordingly, the user can readily perform some kind of action with respect to the real object whose state has changed without having the field of view blocked by a virtual object.

(2) Favorably, the object control device further comprises a real object information management unit which manages real object display determination information in which a user movement and a priority are associated with each other and real object attribute information in which a state change of the real object and a priority are associated with each other, wherein the virtual object display determination unit identifies from the real object display determination information a priority corresponding to a user movement indicated by the user movement information notified by the state communication unit and identifies from the real object attribute information a priority corresponding to a state change indicated by the state change information notified by the state communication unit, and by comparing the two identified priorities, determines whether or not to change a display mode of the virtual object.

According to the configuration described above, a priority corresponding to a user movement indicated by the user movement information is identified using real object display determination information in which a user movement and a priority are associated with each other in advance. In addition, a priority corresponding to a state change of a real object whose state has changed is identified using real object attribute information in which a state change of a real object and a priority is associated with each other in advance. Both identified priorities are then compared to determine whether or not to change the display mode of a virtual object. Accordingly, a virtual object display determination unit is able to determine whether or not to change the display mode of a real object using data set in advance and make the determination accurately and promptly.

(3) Favorably, with the priorities included in the real object display determination information and the real object attribute information, the greater the value, the higher the priority, and when the priority identified from the real object display determination information is equal to or higher than the priority identified from the real object attribute information, the virtual object display determination unit makes a determination to change the display mode of the virtual object.

The real object display determination information specifies a priority of a user movement, and the real object attribute information specifies a priority of a state change of a real object. Therefore, depending on whether or not the priority identified from the real object display determination information is equal to or higher than the priority identified from the real object attribute information, a determination can be made on whether or not the possibility of the user making some kind of movement with respect to the real object whose state has changed is high.

(4) Favorably, when the user movement information notified by the state communication unit is not included in the real object display determination information, the virtual object display determination unit approximates the user movement indicated by the user movement information to user movement information included in the real object display determination information and determines whether or not to change the display mode of the virtual object.

According to the configuration described above, even if a user movement detected by the user movement detection unit is not specified in the real object display determination information, a priority can be identified by approximating the user movement to a user movement specified in the real object display determination information. As a result, priorities can be identified with respect to various user movements in a more flexible manner.

(5) Favorably, the virtual object display determination unit extracts a virtual object that exists at position which blocks the field of view of the user with respect to a real object whose state has changed and changes the display mode of the extracted virtual object.

According to the configuration described above, since only the display mode of the virtual object which blocks the field of view of the user is changed and the display modes of remaining virtual objects are not changed, a sense of presence of a virtual reality space can be imparted to the user by the presence of the virtual objects whose display modes are not changed.

(6) Favorably, the virtual object display determination unit sets a region enclosed by a real object whose state has changed and a current position of the user as a field-of-view region, and changes the display mode of the virtual object at least partially included in the field-of-view region.

According to the configuration described above, a region enclosed by a real object whose state has changed and a current position of a user is set as a field-of-view region, and when at least a part of a virtual object is included in the field-of-view region, the virtual object is determined to be blocking the user's field of view. Therefore, a determination regarding whether or not a virtual object blocks the field of view of the user can be made in an accurate manner.

(7) Favorably, the virtual object display determination unit sets a region which, in a top view, has an arc that is set on a side of a reached-out hand of a user and which has a fan-shape with a certain radius from a real object whose state has changed as an expanded field-of-view region, and changes a display mode of a virtual object included in at least one of the expanded field-of-view region and the field-of-view region.

According to the configuration described above, even with a virtual object not included in the field-of-view region, since a display mode of the virtual object is changed if positioned around the real object whose state has changed, the field of view of the user with respect to the real object whose state has changed can be further improved.

(8) Favorably, the expanded field-of-view region is set such that, in a top view, one side of the fan shape is set from a center of a real object whose state has changed toward the user, and a central angle of the fan shape decreases as an angle formed between a straight line connecting the user and the center of the real object and an orientation of a reached-out hand of the user increases.

Generally, a direction of a field of view of a user is oriented in a direction in which the user reaches out a hand. In the present configuration, since the expanded field-of-view region can be set in a top view so as to spread toward both sides with respect to a direction in which the user reaches out a hand, a virtual object that blocks the field of view of the user can be identified more accurately.

(9) Favorably, the object control device further comprises a virtual object information management unit that manages virtual object management information including a position of the virtual object, and the virtual object display determination unit identifies a position of the virtual object using the virtual object management information.

According to the configuration described above, since a position of a virtual object is managed by the virtual object information management unit, the virtual object display determination unit can easily identify a position of the virtual object.

(10) Favorably, the object control device further comprises a user information management unit that manages user position information including a current position of a user, and the virtual object display determination unit identifies a current position of the user using the user position information.

According to the configuration described above, since a current position of a user is managed by the user information management unit, the virtual object display determination unit can easily identify a current position of the user.

(11) Favorably, when the display mode of the virtual object is changed and then a predetermined gesture to return the display mode to an original mode is made by the user, the virtual object display determination unit restores the display mode to the original mode.

According to the configuration described above, when the display mode of a virtual object is changed and the user subsequently wishes to return the display mode of the virtual object to its original mode, the display mode of the virtual object can be restored to its original mode by making a predetermined gesture.

(12) Favorably, the display mode change involves hiding the virtual object.

According to the configuration described above, since a real object whose state has changed is displayed in front by hiding the virtual object, the user can readily make a movement with respect to the real object.

(13) Favorably, the display mode change involves relocating a display position of the virtual object.

According to the configuration described above, since a real object whose state has changed is displayed in front by relocating the display position of the virtual object, the user can readily make a movement with respect to the real object.

The object control device according to the present invention is useful as means for dynamically and selectively setting and using functions suited to types of objects which have been recognized as objects in a virtual reality space using a head mounted display or the like.

The invention claimed is:

1. An object control processing device that controls display of a virtual object in a virtual reality space,
the processing device comprising:
a user movement detection circuit that detects a movement of a user;
a user movement notification circuit that notifies user movement information indicating a user movement detected by the user movement detection circuit;
a real object state detection circuit that detects a change in a state of a real object existing around the user in the virtual reality space;
a real object state notification circuit that notifies state change information indicating a change in the state of the real object detected by the real object state detection circuit;
a state communication circuit that notifies user movement information notified by the user movement notification circuit and state change information notified by the real object state notification circuit;
a virtual object information management circuit that manages virtual object management information including a position of the virtual object in the virtual reality space;
a virtual object display determination circuit that extracts virtual objects positioned within a certain region in front of the user as display virtual objects from the virtual objects managed by the virtual object information management circuit, extracts from the extracted virtual objects a virtual object existing at a position where a field of the user is blocked with respect to the real object whose state has changed, and determines whether or not to change a display mode of the extracted virtual object so as to expose the real object whose state has changed based on the user movement information and the state change information notified by the state communication circuit;

a UI generation circuit that generates a UI (user interface) to be presented to the user based on a determination result by the virtual object display determination circuit; and a UI display circuit that displays the UI generated by the UI generation circuit, wherein the UI generation circuit generates, when the virtual object display determination circuit determines to change the display mode of the extracted virtual object, the UI so as to change only the display mode of the determined virtual object among the display virtual objects and to maintain display modes of remaining virtual objects, and the UI display circuit superimposes the image around the user and the generated UI, and generates an image of the virtual reality space.

2. The object control device according to claim 1, further comprising:

a real object information management circuit which manages real object display determination information in which a user movement and a priority are associated with each other and real object attribute information in which a state change of the real object and a priority are associated with each other, wherein the virtual object display determination circuit identifies from the real object display determination information a priority corresponding to a user movement indicated by the user movement information notified by the state communication circuit and identifies from the real object attribute information a priority corresponding to a state change indicated by the state change information notified by the state communication circuit, and by comparing the two identified priorities, determines whether or not to change a display mode of the virtual object.

3. The object control device according to claim 2, wherein with respect to the priorities included in the real object display determination information and the real object attribute information, the greater the value, the higher the priority, and when the priority identified from the real object display determination information is equal to or higher than the priority identified from the real object attribute information, the virtual object display determination circuit makes a determination to change the display mode of the virtual object.

4. The object control device according to claim 2, wherein when the user movement information notified by the state communication circuit is not included in the real object display determination information, the virtual object display determination circuit approximates the user movement indicated by the user movement information to user movement information included in the real object display determination information and determines whether or not to change the display mode of the virtual object.

5. The object control device according to claim 1, wherein the virtual object display determination circuit sets a region enclosed by a real object whose state has changed and a current position of the user as a field-of-view region, and changes the display mode of the virtual object at least partially included in the field-of-view region.

6. The object control device according to claim 1, wherein the virtual object display determination circuit sets a region which, in a top view, has an arc that is set on a side of a reached-out hand of a user and which has a fan-shape with a certain radius from a real object whose state has changed as an expanded field-of-view region, and changes a display mode of a virtual object included in at least one of the expanded field-of-view region and the field-of-view region.

7. The object control device according to claim 6, wherein the expanded field-of-view region is set such that, in a top view, one side of the fan shape is set from a center of a real object whose state has changed toward the user, and a central angle of the fan shape decreases as an angle formed between a straight line connecting the user and the center of the real object and an orientation of a reached-out hand of the user increases.

8. The object control device according to claim 1, wherein
the virtual object display determination circuit identifies a position of the virtual object using the virtual object management information.

9. The object control device according to claim 1, further comprising
a user information management circuit that manages user position information including a current position of a user, wherein
the virtual object display determination circuit identifies a current position of the user using the user position information.

10. The object control device according to claim 1, wherein when the display mode of the virtual object is changed and then a predetermined gesture to return the display mode to an original mode is made by the user, the virtual object display determination circuit restores the display mode to the original mode.

11. The object control device according to claim 1, wherein the display mode change involves hiding the virtual object.

12. The object control device according to claim 1, wherein the display mode change involves relocating a display position of the virtual object.

13. An object control method used by an object control device that controls display of a virtual object in a virtual reality space,
the object control method comprising:
a user movement detection step of detecting a movement of a user by a user movement detection unit;
a user movement notification step of notifying by a user movement notification unit user movement information indicating a user movement detected by the user movement detection unit;
a real object state detection step of detecting by a real object state detection unit a change in a state of a real object existing around the user in the virtual reality space;
a real object state notification step of notifying by a real object state notification unit state change information indicating a change in the state of the real object detected by the real object state detection unit;
a state communication step of notifying by a state communication unit user movement information notified by the user movement notification unit and state change information notified by the real object state notification unit;
a virtual object display determination step of extracting virtual objects positioned within a certain region in front of the user as display virtual objects from the virtual objects managed by the virtual object information management unit, extracts from the extracted virtual objects a virtual object existing at a position where a field of the user is blocked with respect to the real object whose state has changed, and determining by a virtual object display determination unit whether or not to change a display mode of the virtual object so as to expose the extracted real object whose state has changed based on the user movement information and the state change information notified by the state communication unit;

a UI generation step of generating by a UI generation unit a UI (user interface) to be presented to the user based on a determination result by the virtual object display determination unit; and a UI display step of displaying by a UI display unit the UI generated by the UI generation unit, wherein the UI generation step generates, when the virtual object display determination unit determines to change the display mode of the extracted virtual object, the UI so as to change only the display mode of the determined virtual object among the display virtual objects and to maintain display modes of remaining virtual objects, and the UI display step superimposes the image around the user and the generated UI, and generates an image of the virtual reality space.

14. A non-transitory computer-readable recording medium which stores an object control program which causes a computer to operate as an object control device that controls display of a virtual object in a virtual reality space, the object control program causing the computer to function as:

a user movement notification unit that notifies user movement information indicating a movement of a user detected by a user movement detection unit;

a real object state notification unit that notifies state change information indicating a change in a state of a real object existing in a periphery of the user in the virtual reality space which is detected by a real object state detection unit;

a state communication unit that notifies user movement information notified by the user movement notification unit and state change information notified by the real object state notification unit;

a virtual object information management unit that manages virtual object management information including a position of the virtual object in the virtual reality space;

a virtual object display determination unit that extracts virtual objects positioned within a certain region in front of the user as display virtual objects from the virtual objects managed by the virtual object information management unit, extracts from the extracted virtual objects a virtual object existing at a position where a field of the user is blocked with respect to the real object whose state has changed, and determines whether or not to change a display mode of the extracted virtual object so as to expose the real object whose state has changed based on the user movement information and the state change information notified by the state communication unit; and a UI generation unit which generates a UI (user interface) to be presented to the user based on a determination result by the virtual object display determination unit and which causes the UI to be displayed by a UI display unit, wherein the UI generation unit generates, when the virtual object display determination unit determines to change the display mode of the extracted virtual object, the UI so as to change only the display mode of the determined virtual object among the display virtual objects and to maintain display modes of remaining virtual objects.

15. An integrated circuit for an object control device that controls display of a virtual object in a virtual reality space, the integrated circuit comprising:

a processor;

a user movement notification unit that notifies user movement information indicating a movement of a user detected by a user movement detection unit;

a real object state notification unit that notifies state change information indicating a change in a state of a real object existing in the virtual reality space which is detected by a real object state detection unit and positioned in a periphery of the user in the virtual reality space;

a state communication unit that notifies user movement information notified by the user movement notification unit and state change information;

a virtual object information management unit that manages virtual object management information including a position of the virtual object in the virtual reality space;

a virtual object display determination unit that extracts virtual objects positioned within a certain region in front of the user as display virtual objects from the virtual objects managed by the virtual object information management unit, extracts from the extracted virtual objects a virtual object existing at a position where a field of the user is blocked with respect to the real object whose state has changed, and determines whether or not to change a display mode of the virtual object so as to expose the real object whose state has changed based on the user movement information and the state change information notified by the state communication unit; and a UI generation unit which generates a UI (user interface) to be presented to the user based on a determination result by the virtual object display determination unit and which causes the UI to be displayed by a UI display unit, wherein the UI generation unit generates, when the virtual object display determination unit determines to change the display mode of the extracted virtual object, the UI so as to change only the display mode of the determined virtual object among the display virtual objects and to maintain display modes of remaining virtual objects.

* * * * *